(12) United States Patent
Baugh

(10) Patent No.: US 6,273,643 B1
(45) Date of Patent: Aug. 14, 2001

(54) APPARATUS FOR DEPLOYING AN UNDERWATER PIPE STRING

(75) Inventor: Benton F. Baugh, Houston, TX (US)

(73) Assignee: Oil States Industries, Arlington, TX (US)

( * ) Notice: Subject to any disclaimer, the term of this patent is extended or adjusted under 35 U.S.C. 154(b) by 0 days.

(21) Appl. No.: 09/301,751

(22) Filed: Apr. 29, 1999

Related U.S. Application Data
(60) Provisional application No. 60/083,964, filed on May 1, 1998.

(51) Int. Cl.[7] ................................................ F16L 1/12
(52) U.S. Cl. ................... 405/166; 405/158; 405/168.1
(58) Field of Search .................................. 405/154, 158, 405/166, 167, 168.1–168.3, 169, 170; 52/116

(56) References Cited

U.S. PATENT DOCUMENTS

| | | | |
|---|---|---|---|
| 2,048,208 | 7/1936 | Young et al. | 294/90 |
| 3,331,212 | 7/1967 | Cox et al. | 61/72.3 |

(List continued on next page.)

FOREIGN PATENT DOCUMENTS

| | | | |
|---|---|---|---|
| 973371 | 8/1975 | (CA) | 405/166 |
| 2 456 141 A1 | 8/1976 | (DE). | |
| 0 020 257 | 12/1980 | (EP). | |
| 1 532 570 | 7/1968 | (FR). | |
| 1178219 | 1/1970 | (GB). | |
| 2 336 191A | 10/1999 | (GB). | |
| 2 339 251A | 1/2000 | (GB). | |

OTHER PUBLICATIONS

ETPM, "Pipe Laying With An Inclined Ramp," Enterpose G.T.M, Paris, France, 6 pages (1978).
"New modular J–lay system designed for deepwater projects," OFFSHORE Pipe Line Technology, pp. 9–12 (Apr. 1999).
Benton F. Baugh, U.S. Patent application Ser. No. 09/301, 527 filed Apr. 28, 1999 and prosecution history up to Nov. 14, 2000.
Benton F. Baugh, U.S. Patent application Ser. No. 09/301, 694 filed Apr. 29, 1999 and prosecution history up to Apr. 29, 1999.

(List continued on next page.)

Primary Examiner—David Bagnell
Assistant Examiner—Jong-Suk Lee
(74) Attorney, Agent, or Firm—Howrey Simon Arnold & White

(57) ABSTRACT

An apparatus for deploying an underwater pipe string includes a mast, an articulated table, a stinger, and a pipe erector. The mast is affixed to the articulated table and extends above the articulated table. The stinger is affixed to the articulated table and depends below the articulated table. The pipe erector is connected to the mast for loading pipe joints up to the mast. A pipe joint loaded in the mast is welded to the pipe string, which depends from the articulated table and through the stinger toward a seabed. The stationary table is articulated for tilting of the table, the mast, and the stinger azimuthally and angularly for a preferred direction and lay angle of the pipe string being deployed.

22 Claims, 19 Drawing Sheets

U.S. PATENT DOCUMENTS

| | | | |
|---|---|---|---|
| 3,472,034 | * 10/1969 | Lawrence | 405/166 |
| 3,524,326 | 8/1970 | Craste | 405/166 |
| 3,581,506 | * 6/1971 | Howard | 405/166 |
| 3,602,175 | 8/1971 | Morgan et al. | 114/0.5 |
| 3,680,322 | * 8/1972 | Nolan, Jr. et al. | 61/72.3 |
| 3,737,180 | 6/1973 | Hayes, Jr. et al. | 285/197 |
| 3,747,356 | * 7/1973 | Lochridge et al. | 405/168.2 |
| 3,750,451 | 8/1973 | Nolan, Jr. | 72/393 |
| 3,775,987 | 12/1973 | Rochelle et al. | 61/72.3 |
| 3,860,122 | * 1/1975 | Cernosek | 414/732 |
| 4,068,490 | 1/1978 | Jegousse | 61/108 |
| 4,091,629 | 5/1978 | Gunn et al. | 61/72.4 |
| 4,109,480 | * 8/1978 | Sumner | 405/170 X |
| 4,154,037 | 5/1979 | Anderson | 52/296 |
| 4,202,653 | 5/1980 | Moller | 414/22 |
| 4,257,718 | 3/1981 | Rosa et al. | 405/167 |
| 4,290,495 | 9/1981 | Elliston | 175/85 |
| 4,324,194 | 4/1982 | Elliston | 114/264 |
| 4,340,322 | * 7/1982 | Springett et al. | 405/168 |
| 4,347,029 | 8/1982 | Latimer et al. | 414/22 |
| 4,486,123 | * 12/1984 | Koch et al. | 405/169 |
| 4,547,096 | 10/1985 | Daigle et al. | 405/251 |
| 4,561,803 | 12/1985 | Campo et al. | 405/224 |
| 4,569,168 | * 2/1986 | McGovney et al. | 52/122.1 |
| 4,591,294 | 5/1986 | Foulkes | 405/170 |
| 4,704,050 | * 11/1987 | Wallace | 405/169 X |
| 4,717,353 | 1/1988 | Block | 439/310 |
| 4,723,874 | 2/1988 | Recalde | 405/166 |
| 4,759,414 | * 7/1988 | Willis | 175/170 |
| 4,784,527 | 11/1988 | Hunter et al. | 405/207 |
| 4,917,540 | 4/1990 | Recalde | 405/168 |
| 4,992,001 | 2/1991 | Harrison | 405/166 |
| 5,000,416 | 3/1991 | Fantasia | 248/650 |
| 5,145,289 | * 9/1992 | Titus | 405/169 |
| 5,269,630 | * 12/1993 | Bolin et al. | 405/230 |
| 5,347,101 | 9/1994 | Brennan et al. | 219/124.34 |
| 5,380,130 | 1/1995 | Kessler et al. | 405/195.1 |
| 5,421,675 | 6/1995 | Brown et al. | 405/170 |
| 5,458,441 | 10/1995 | Barry | 405/170 |
| 5,464,307 | 11/1995 | Wilkins | 405/166 |
| 5,527,134 | * 6/1996 | Recalde | 405/166 |
| 5,533,834 | 7/1996 | Racalde | 405/166 |
| 5,603,588 | 2/1997 | Herbert | 405/172 |
| 5,836,719 | 11/1998 | Martin et al. | 405/166 |
| 5,857,715 | 1/1999 | Gray et al. | 285/131.1 |
| 5,971,666 | * 10/1999 | Martin et al. | 405/166 |
| 6,004,071 | 12/1999 | Broeder et al. | 405/166 |

OTHER PUBLICATIONS

Benton F. Baugh, U.S. Patent application Ser. No. 09/301,695 filed Apr. 29, 1999 and prosecution history up to Oct. 30, 2000.

Benton F. Baugh, U.S. Patent application Ser. No. 09/301,692 filed Apr. 29, 1999 and prosecution history up to Nov. 26, 2000.

Benton F. Baugh, U.S. Patent application Ser. No. 09/301,693 filed Apr. 29, 1999 and prosecution history up to Nov. 13, 2000.

Benton F. Baugh, U.S. Patent application Ser. No. 09/301,701 filed Apr. 29, 1999 and prosecution history up to Dec. 13, 2000 (including a Petition for Express Abandonment of Patent Application After Payment of Maintenance Fee).

* cited by examiner

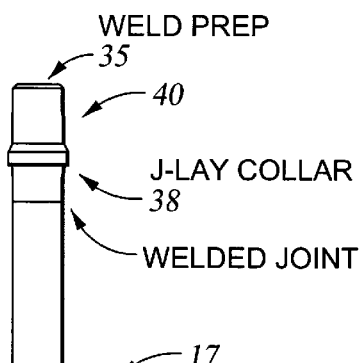
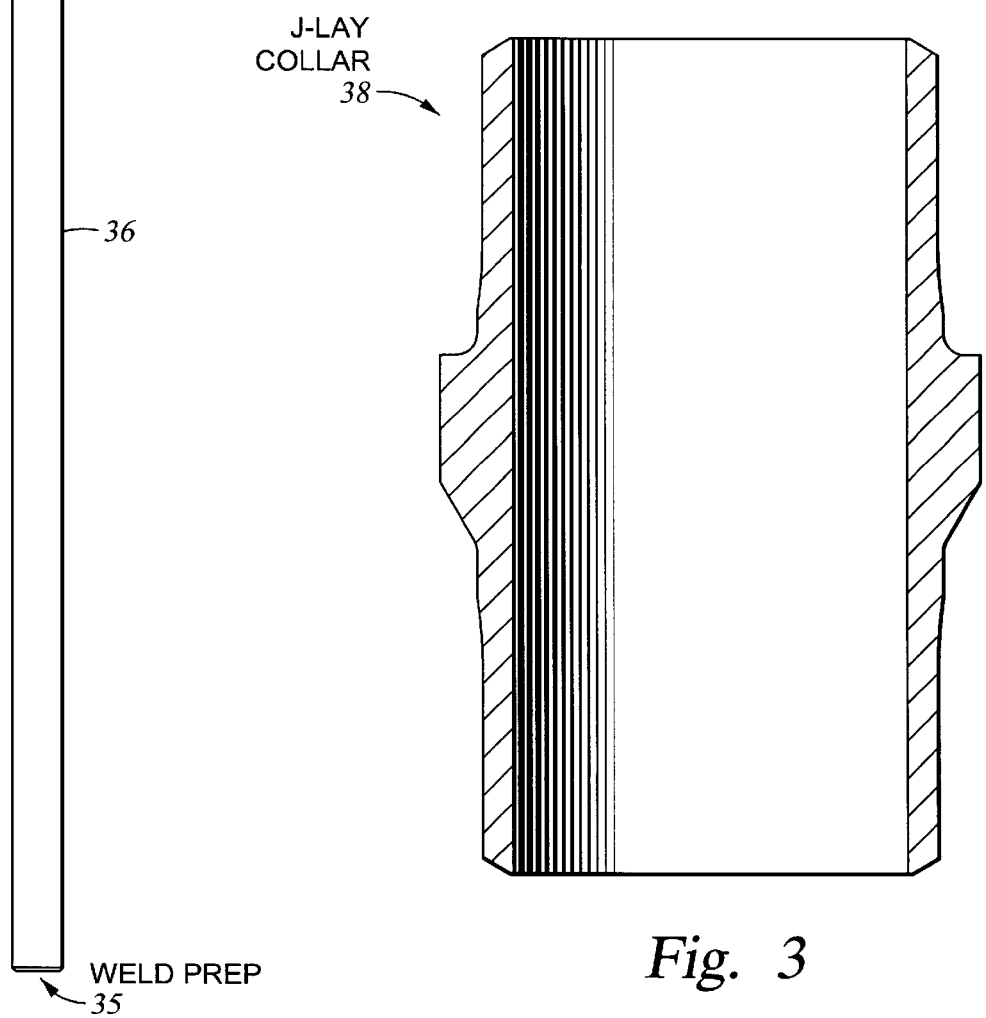
Fig. 2
Fig. 3

APPARATUS FOR DEPLOYING AN UNDERWATER PIPE STRING

RELATED APPLICATIONS

This application is a continuation of provisional application 60/083,964 filed May 1, 1998, incorporated herein by reference.

BACKGROUND OF THE INVENTION

1. Field of the Invention

This invention relates generally to laying underwater pipe and, more particularly, to installing underwater pipelines on the seabed and/or connecting the same to floating terminals at the surface.

2. Description of the Related Art

Floating production facilities require risers to provide fluid conduits between subsea equipment and the surface facility (or platform). The floating structure responds dynamically to the forces of the environment to which it is exposed. This means that the conduit connecting the structure and subsea equipment must be connected in a manner that accommodates relative motions. The conduit, of course, requires top and bottom interfaces to establish functional connections. At one time, flexible pipe was considered as the only feasible means of providing flowline connections from equipment on the sea bed to a floating production vessel. However, flexible pipe is very expensive, much more so than standard steel pipe. As a result, the use of steel pipe in deep water risers was developed as an alternative means of achieving the sea bed connection. This presented the practical problem of how to deploy a steel pipe string vertically from a starting point on the ocean floor to a hand-off and terminus at a floating production system; thereby leading to the development and use of J-Lay towers for this purpose.

The assembly and deployment of subsea steel pipelines from floating vessels usually employs a J-Lay tower, especially in deep water. The J-Lay tower provides a vertical, or nearly vertical, platform for welding lengths of pipe into a pipe string. The J-Lay tower tension feeds the pipe string from an anchor on the seabed. Prepared lengths of pipe, known as "pipe joints," are fed one at a time into the J-Lay tower and welded together to form the pipe string. The angle at which the assembled pipe string leaves the vessel to enter the water is controlled by the angle and azimuth of the tower mast and "stinger," which is an inverted structure pointing down into the water underneath the J-Lay tower, relative to the pipe string being deployed.

Previous J-Lay tower installations have employed vertical masts rigidly installed on pipe lay vessels. These installations utilized pipe tensioners integrated into the mast for control of the pipe string during deployment and hand-off operations. J-Lay towers have been manufactured with the ability to lower pipe straight down, or with an angle provided by a cone shaped stinger. Other towers have been installed at a fixed angle to allow a departure from the base at an approximation of the best average departure direction. Any angular departure of the pipeline from purely vertical in the first case or from the preset pipe angle in the second case would cause the pipeline to be bent around the stinger. Also, most current stingers employ a static, fixed structure that imposes either cylindrical or conical shaped excursion boundaries on the emerging pipe string.

Rigidly installed, vertical towers engender a number of problems caused by an inability to respond in real time to the dynamic forces encountered during pipe laying operations. For instance, welding and assembly operations are performed at the working floor on pipe with a substantial imposed moment. Other deficiencies include the fact that they do not allow: 1) control of the bending stress and tension within the pipe string as it is deployed in an arc to the sea bed; 2) the laying vessel to weather vane or rotate about the pipe and thereby prevent torsional wind-up of the pipe string; and 3) precise control of the pipe lay envelope. Further, current J-Lay tower designs omit any means for precise and accurate alignment of the pipe string and new pipe joints during the welding process. Current methods for deploying pipe also encounter problems not directly associated with the use of rigidly installed, vertical towers. None efficiently and/or automatically feed pipe joints into the tower or align the pipe joints with the tower center line to facilitate assembling the pipe string 12.

Current stinger designs have a problem in that the internal geometry of the stinger is usually fixed at the diameter of the pipe string being deployed. In order to allow the passage of large diameter packages integrated into the pipe string, the stinger must be dismantled or removed from around the hanging pipe string. Additionally, such stingers only act as guide conduits for the pipe and do not stabilize, i.e., control the alignment of, the pipe as it emerges from the weld floor.

The present invention is directed to overcoming, or at least reducing the effects of, one or more of the problems set forth above.

SUMMARY OF THE INVENTION

An apparatus for deploying pipe string is disclosed. The apparatus comprises a mast; an articulated stationary table to which the mast is affixed; a stinger affixed to the stationary table to articulate with the mast; and a pipe erector operatively connected to the mast.

BRIEF DESCRIPTION OF THE DRAWINGS

Other objects and advantages of the invention will become apparent upon reading the following detailed description and upon reference to the drawings in which:

FIGS. 2–5 illustrate an individual pipe joint and parts used to prepare the pipe joint to be incorporated into a pipe string as may be deployed by the embodiment of FIG. 1;

Figure 1:
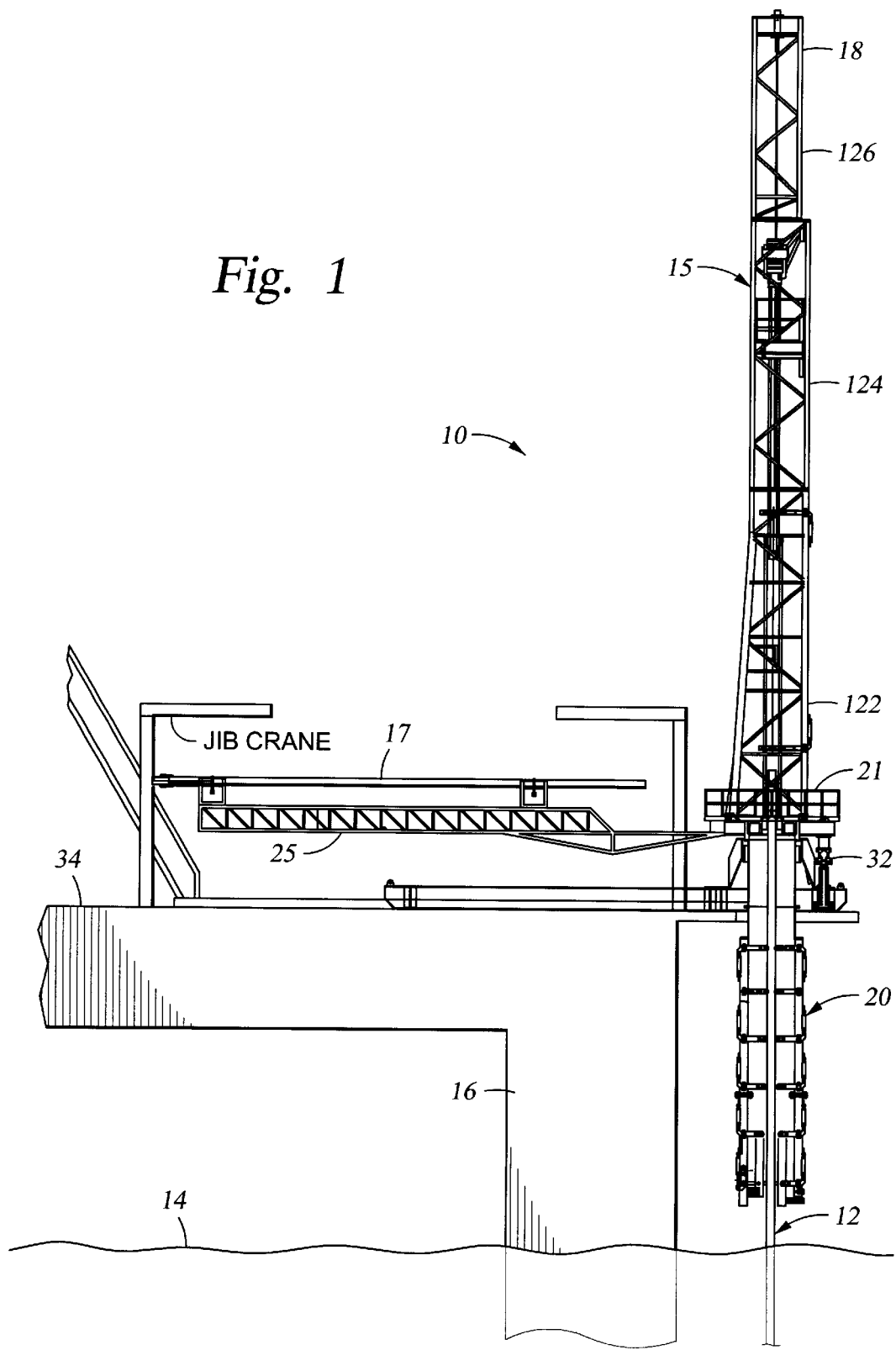
FIG. 1 illustrates one embodiment of an apparatus for assembling and deploying pipe string underwater, the apparatus constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates an apparatus 10 as may be used in various embodiments to deploy a pipe string 12 beneath the surface of a body of water 14 from a vessel 16. Note that, although this disclosure is frequently in terms of subsea operations, it is to be understood that the invention is not limited to oceanic or maritime applications. The invention may be employed with any large body of water including, but not limited to, oceans, seas, gulfs, and lakes. The apparatus 10 is articulated as set forth in more detail below and may be used to deploy the pipe string 12 for a variety of purposes. Exemplary purposes include installing pipelines on the seabed (not shown) and deploying risers between a pipe string 12 (also not shown) on the seabed and the vessel 16. As those in the art will recognize, the term "pipe string 12" refers to a plurality of pipe joints 17, or pieces of pipe, affixed together and, thus, may generically be used to refer to pipelines and risers. The pipe joints are commonly referred to as pipe sections, pipe segments, and pipe lengths.

The particular embodiment of the apparatus 10 illustrated in FIG. 1 is a tower system 10 and generally comprises a mast 15, a stinger 20, and a pipe erector 25, all of which are articulated. Generally, a prepared pipe joint 17 is loaded onto a pipe erector 25, which then loads it into the mast 15. Once loaded, the pipe joint 17 is then affixed to the end of the pipe string 12, whereupon it becomes a constituent part of the pipe string 12. The pipe string 12 can then be further deployed through the stinger 20 and the mast 15. The pipe joints 17, apparatus 10, and the method of using the apparatus 10 just now generally described are set forth in greater detail below.

Figure 4:
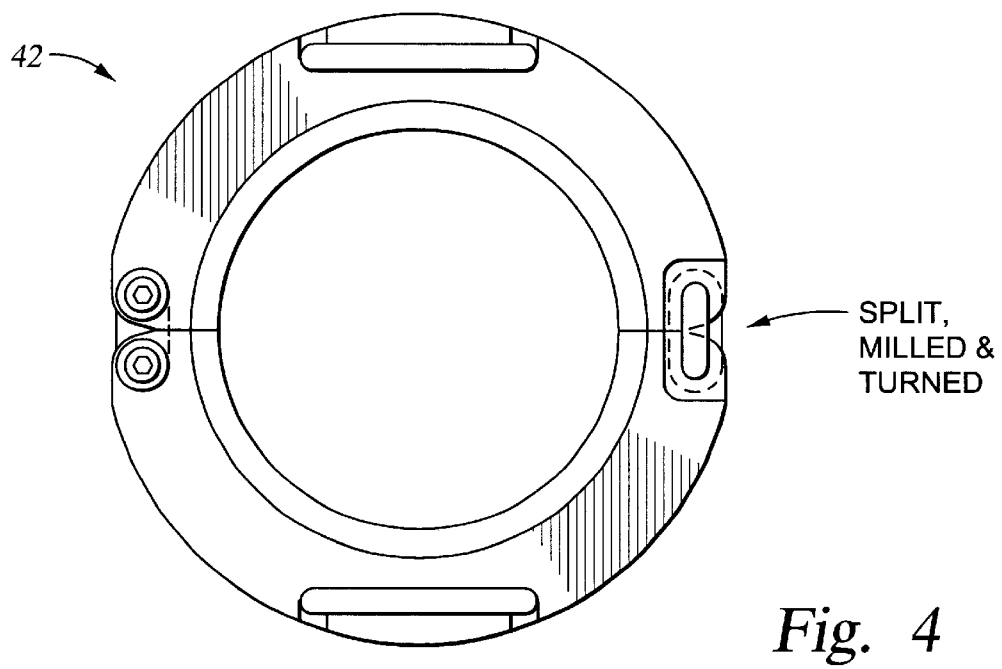
Figure 5:
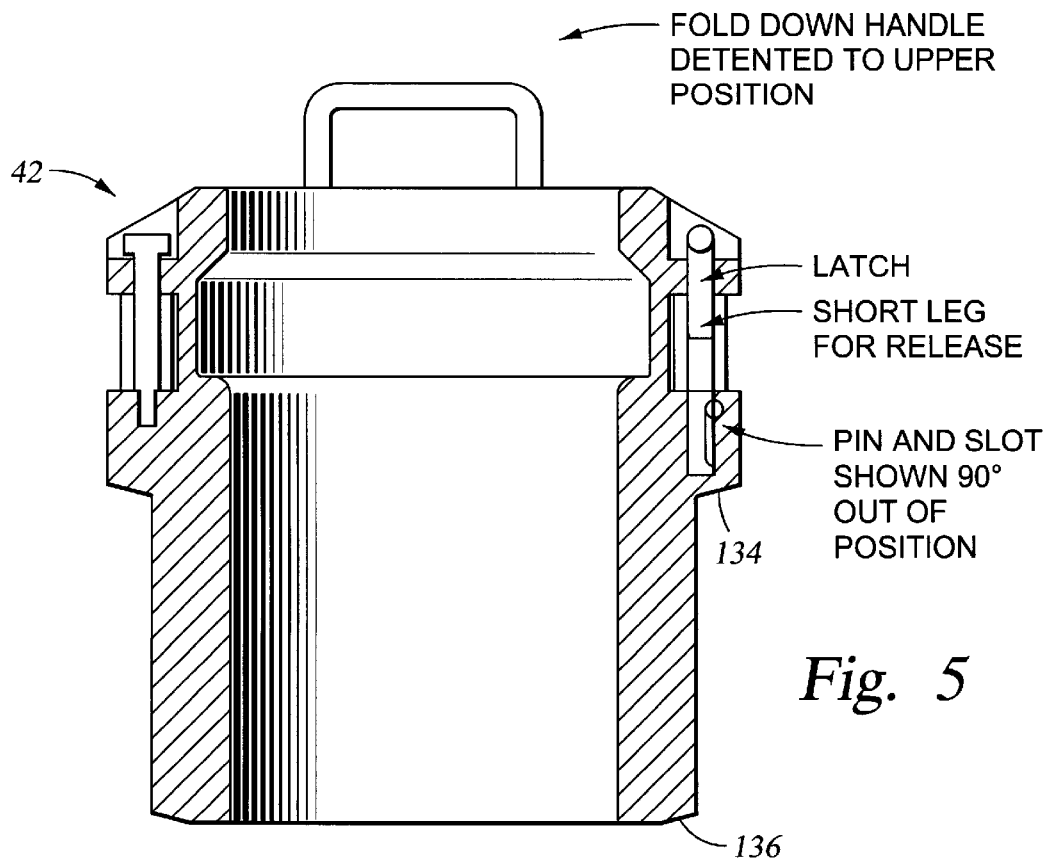
Figure 8:
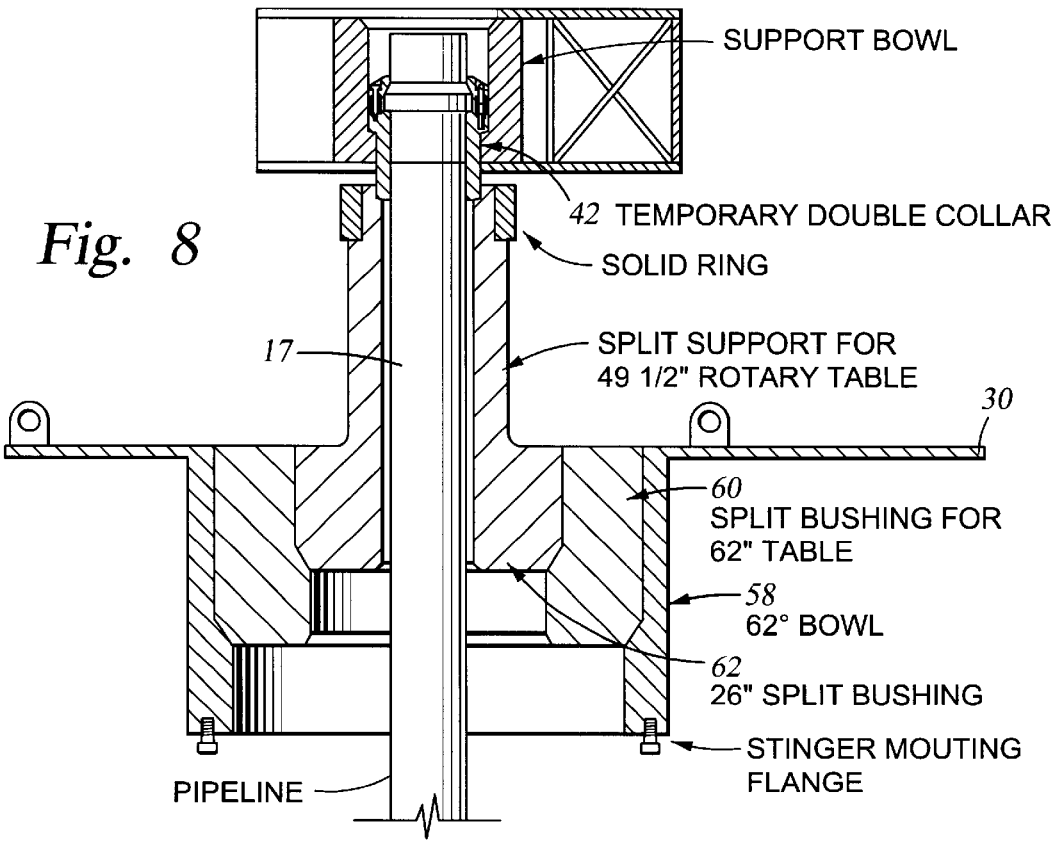
FIG. 8 is a partial cross-sectional view of a part of the embodiment of FIG. 1.
Figure 9:
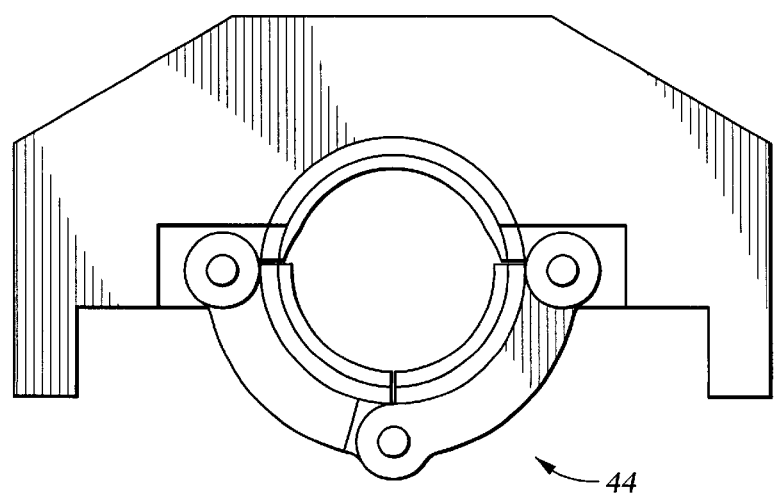
FIGS. 9–12 illustrate, in various views, the clamping system of the embodiment of FIG. 1.

The pipe string 12 comprises a plurality of pipe joints 17. Each pipe joint 17 comprises an individual pipe length 36, shown in FIG. 2, which will be assembled (via welding) into the deployed pipe string 12. Each pipe length 36 is prepared for assembly by machining weld prep surfaces 35 at each end of the pipe length 36. A J-Lay collar 38, such as that shown in cross-section in FIG. 3, is welded to the upper end 40 of each pipe length 36. The pipe joints 17 are then painted with a corrosion protection system in a manner commonly known in the art. A double collar 42, shown in FIGS. 4–5, is then affixed to the pipe joint 17 around the J-lay collar 38 as shown in FIG. 8. The double collar 42 is a temporary split collar with multiple landing surfaces at differing diameters. It is used to secure the individual pipe joints 17 and the pipe string 12 at various stages in the assembly and deployment sequence as set forth below.

Figure 6:
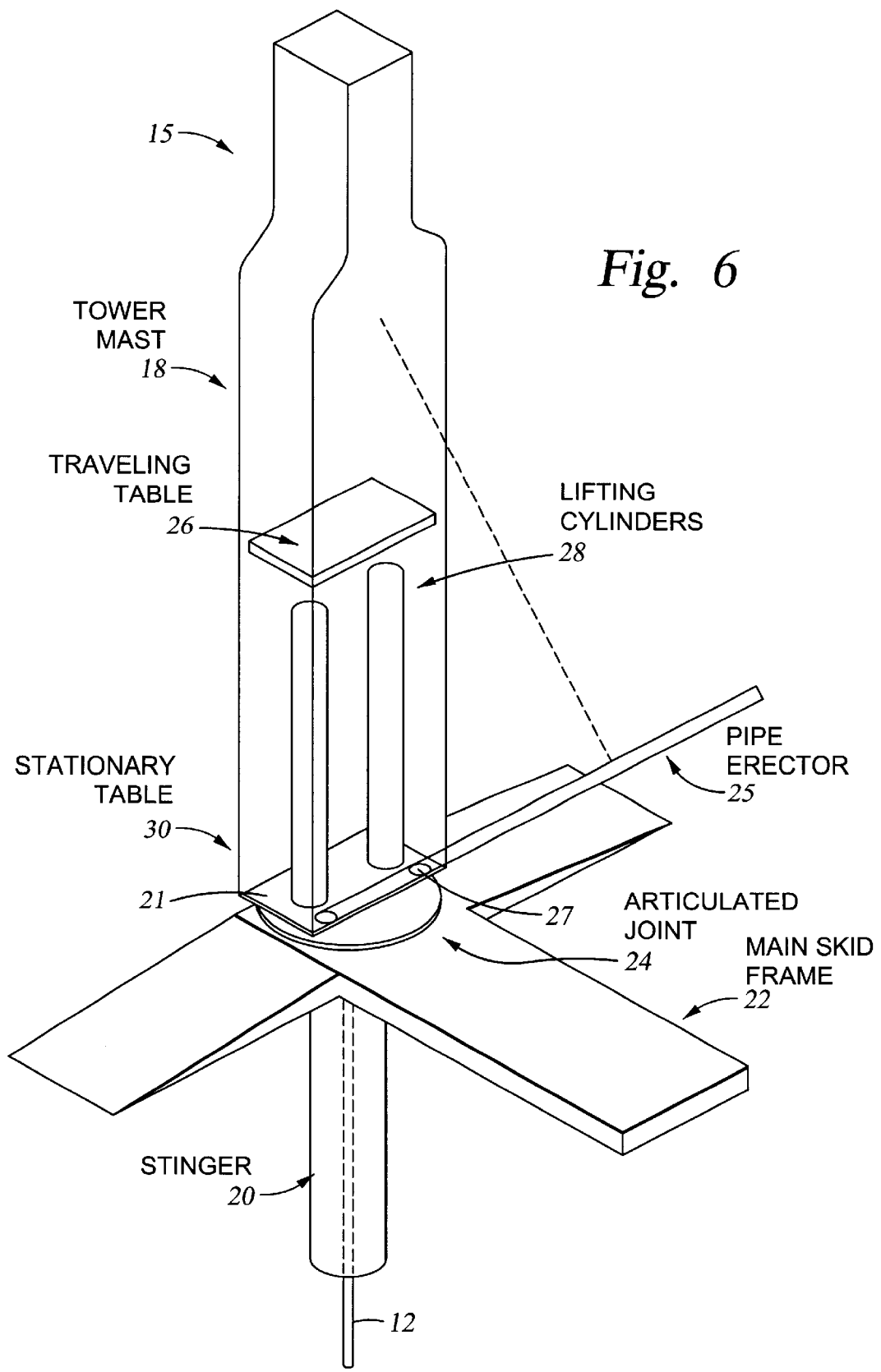
FIG. 6 is a conceptualized perspective view of part of the tower system 10 of the embodiment in FIG. 1.
Figure 7:
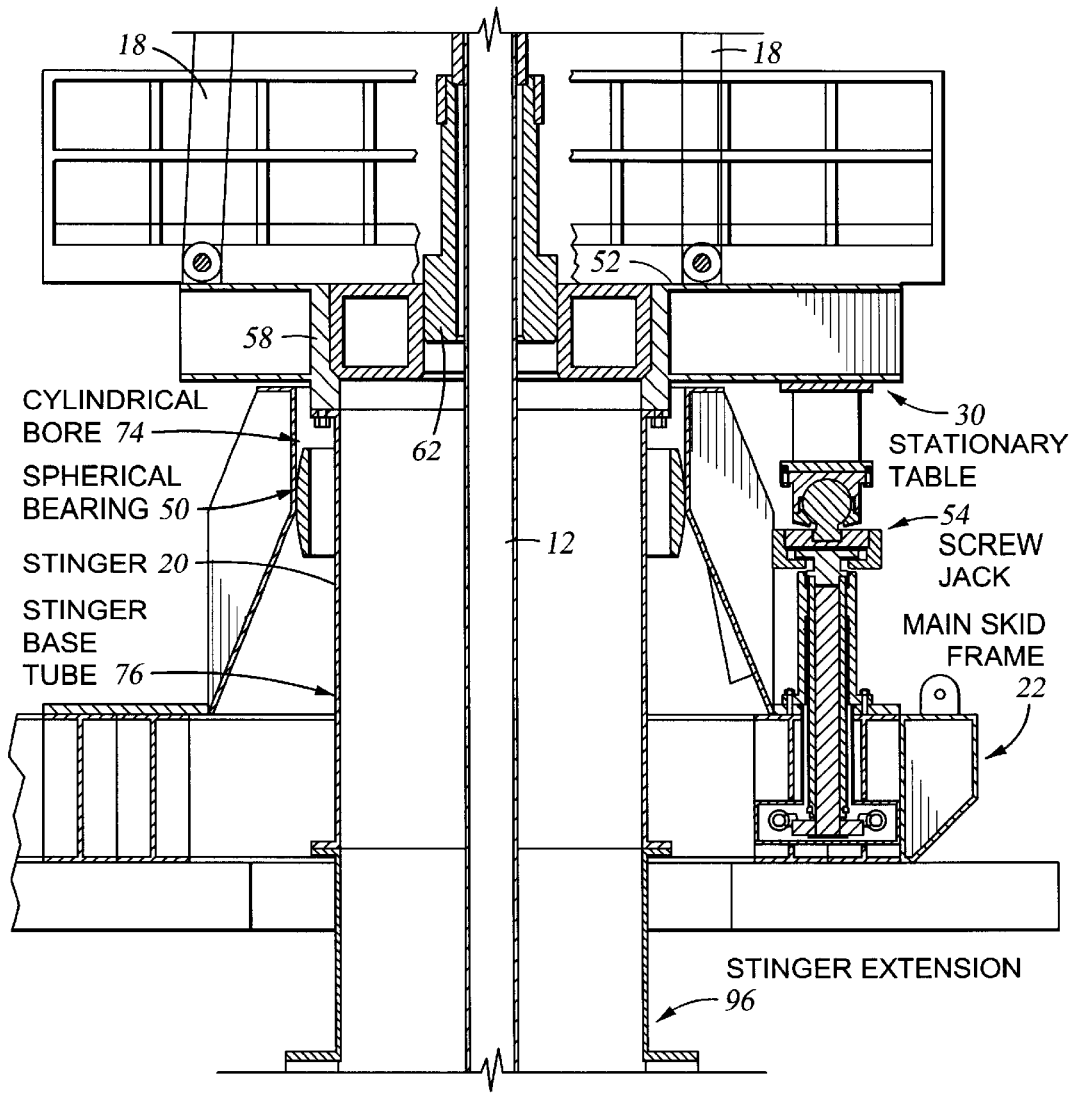
FIG. 7 is a partial cross-sectional, side view of part of the tower system 10 of the embodiment in FIG. 1.

Turning now to FIG. 6 and to FIG. 7, a part of one particular embodiment for the mast 15 of FIG. 1 is shown. The embodiment includes a mast 15 joined to a main skid frame 22 through an articulated joint 24. The tower mast 15 includes a traveling table 26, a pair of hydraulic cylinders 28, and a stationary table 30. The mast 15 and stationary table 30 also rest upon and are connected to a plurality of screw jacks 54.

Figure 10:
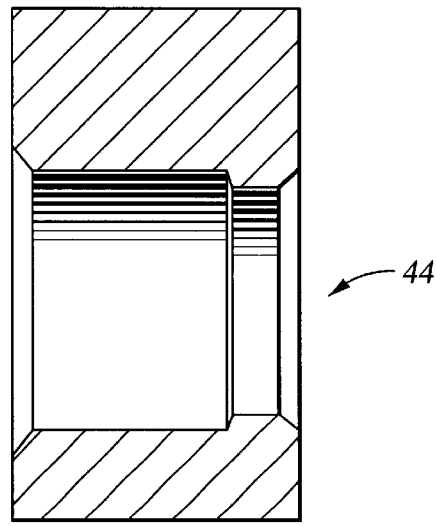
Figure 11:
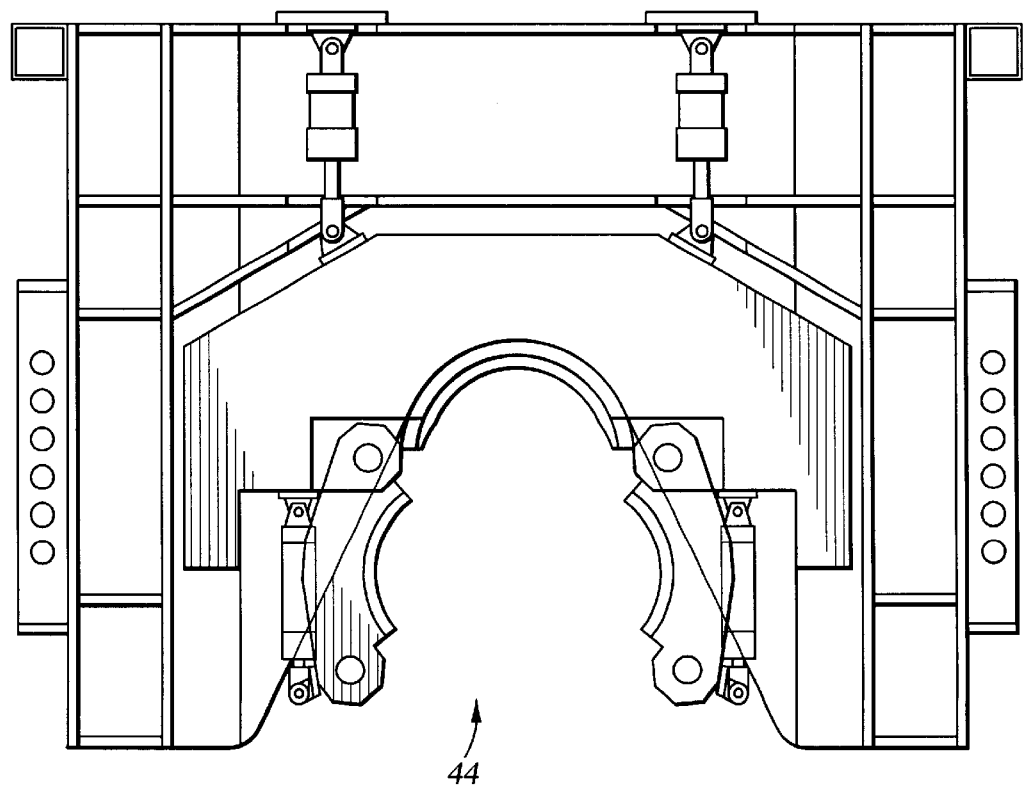
Figure 12:
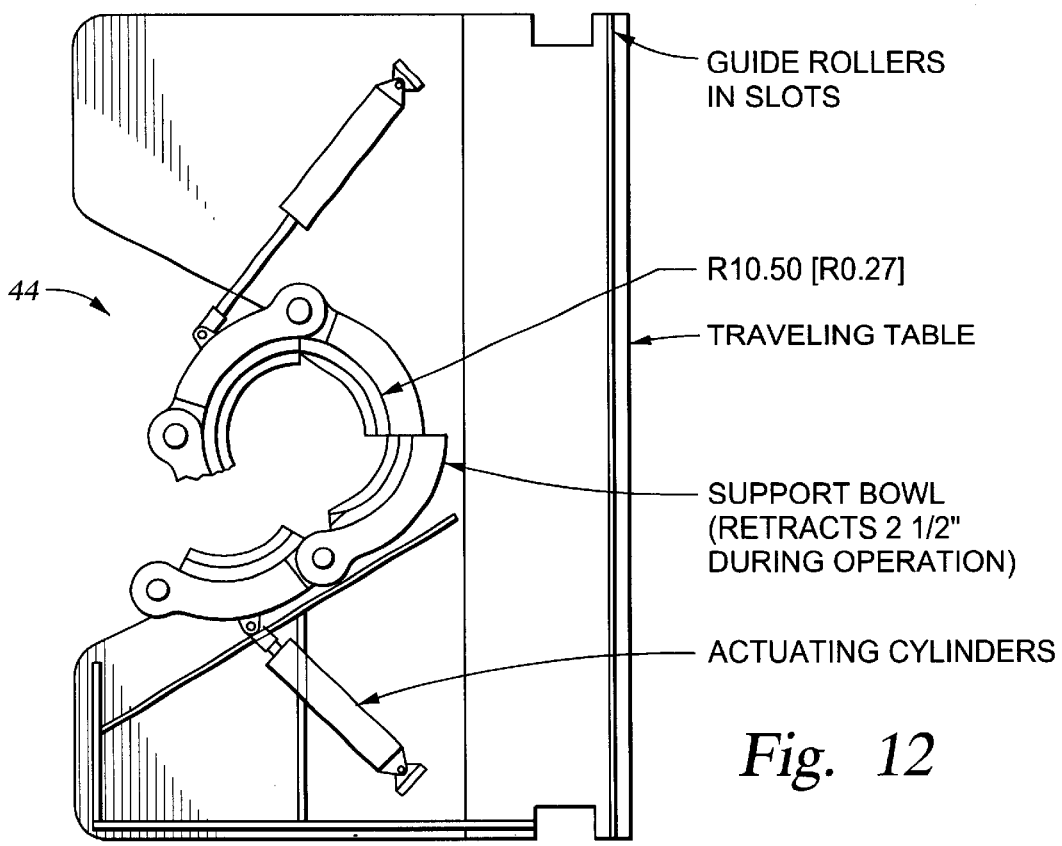

The mast 15 is a three-part, welded, steel truss structure 18 mounted to the top surface 21 of the stationary table 30. It supports two very large, hydraulic lifting cylinders 28 (with 500,000 lbs. lift capacity each), the traveling table 26, the pipe clamping system 44 shown in FIGS. 10–12, and the weld alignment system 46 shown in FIGS. 17A–17B. Returning to FIG. 6 and to FIG. 7, the hydraulic cylinders 28 provide the vertical lift and tensioning capability on the pipe string 12. Multiple wire ropes (not shown) tied to the base of the cylinders 28 at the stationary table 30 run over sheaves (also not shown) mounted at the top of the hydraulic cylinders 28 to the traveling table 26. This arrangement effectively multiplies the cylinder stroke and doubles the vertical movement of the traveling table 26. The mast 15 acts as the guide mechanism for vertical movement of the traveling table 26. It also mounts the two centralizing units 48 discussed below that center the pipe joint 17 and straighten it prior to welding at the lower end as discussed further below.

The main skid frame 22 is a welded plate structure designed to support the entire tower system 10 via the stationary table 30 and all associated equipment. It provides the interface with the deck 34 of the vessel 16 and distributes the system loads over a large area of the deck 34.

Referring now to FIG. 7 and to FIG. 8, the stationary table 30 is a welded steel plate structure with a 62.0" diameter hole 52 at its center for riser deployment. The stationary table 30 provides a common rigid interface for the mast 15, stinger 20, and erector 25. It is supported by three screw jacks 54 and a gimbaled bearing 50 which are installed on the main skid frame 22. A 62.0" bowl 58 is permanently installed in the riser hole 52 of the stationary table 30. A 62.0" split bushing 60 is nested inside the bowl 58. A 26.0" bushing 62 is, in turn, installed in the 62.0" bushing 60. The 26.0" bushing 62 supports the pipe string 12 (via the temporary double collar 48 on the last pipe joint 17 in the pipe string 12) while the next pipe joint 17 is being welded in place.

Turning now to FIGS. 9–12, the traveling table 26 is a welded steel plate structure powered by the twin lifting cylinders 28 (shown in FIG. 6). It receives the top ends of the pipe joints 17 as they are lifted from the horizontal by the erector 25. A split clamp 44 installed on the traveling table 26 secures the end of the pipe joint 17 (around a temporary double collar 42) and holds it in place while the pipe joint 17 is aligned by the mast 15 centralizing units 48 in preparation for welding at the lower end. The traveling table 26 supports the swivel bearing 65, shown in FIGS. 13A–13B, when in use, the swivel bearing 65 being inserted between the double collar 42 and the split clamp 44. Note that FIG. 13B is a split view drawing, presenting View A wherein the swivel bearing 65 is inserted into the traveling table 26 and View B wherein the traveling table 26 is shown without the swivel bearing 65.

Figure 13A:
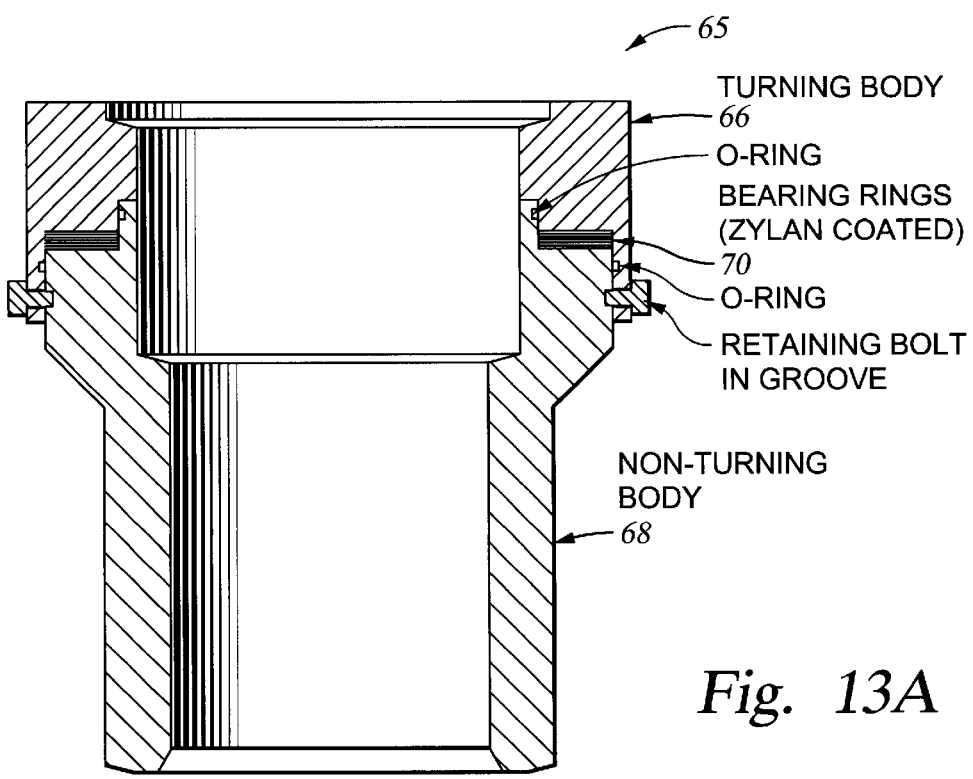
FIGS. 13A–13B illustrate the swivel bearing of the embodiment in FIG. 1.

Referring now to FIG. 13A, the swivel bearing 65 is a mechanical bearing consisting of a turning body 66 and a non-turning body 68 with multiple, compression loaded, zylan coated, shear rings 70 interposed between them. The turning body 66 interfaces and supports the double collar 42; the non-turning body 68 interfaces with the split clamp 44 on the floor of the traveling table 26. The shear rings 70 shear relative to one another in order to accommodate the differential motion between the turning body 66 and the non-turning body 68.

Figure 13B:
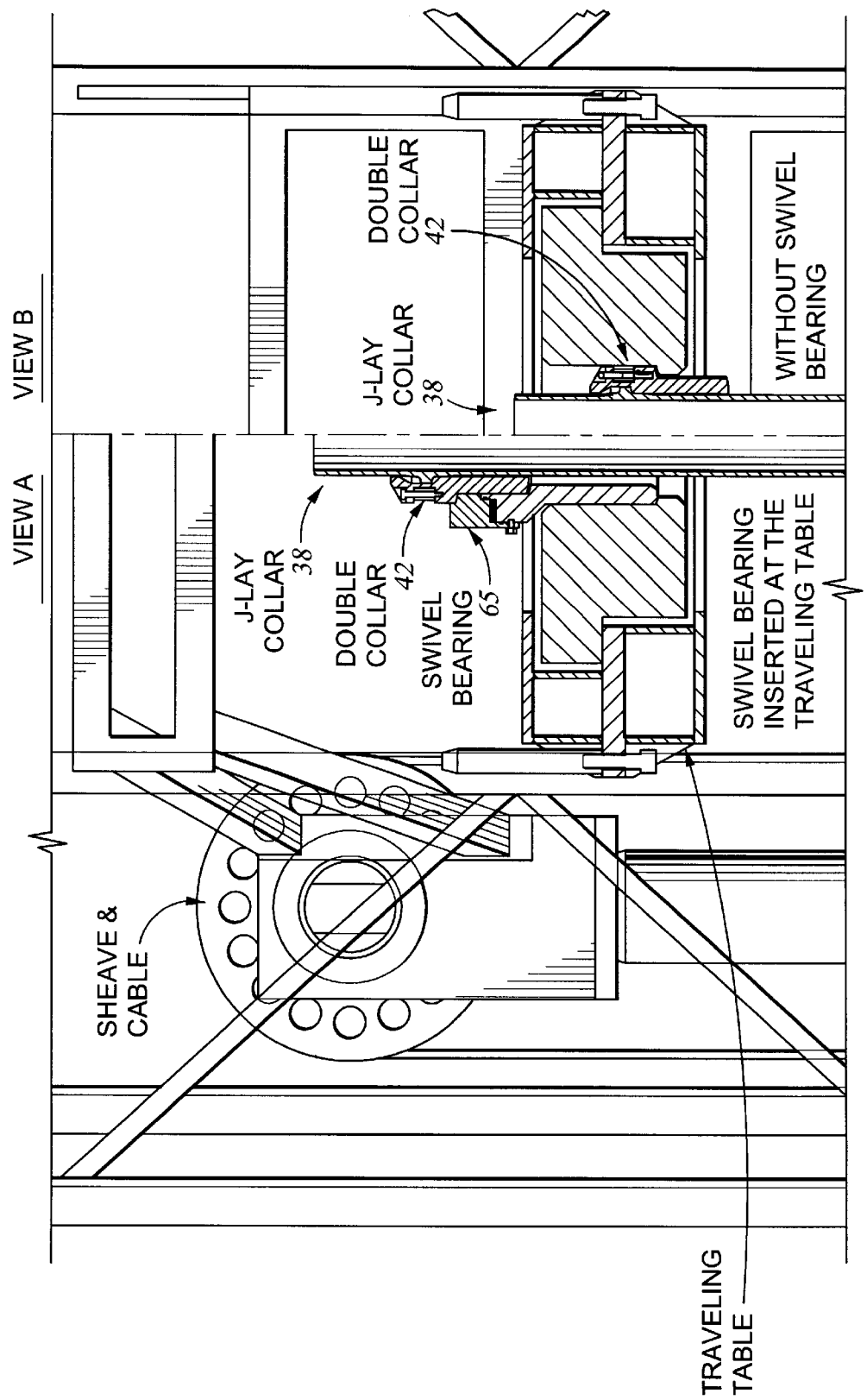

When needed, the swivel bearing 65 is inserted at the traveling table 26 as shown in FIG. 13B and carries the weight of the pipe string 12 during vessel 16 turning operations and heading adjustments. The swivel bearing 65 provides a rotating interface between the pipe string 12 and the mast 15. The swivel bearing 65 also has numerous applications other than that disclosed above. For instance, the swivel 65 might be used in many other applications requiring torsional isolation within a system without interrupting load path continuity and a high load capacity.

Referring once again to FIG. 7, the stationary table 30 and the main skid frame 22 define the articulated joint 24 employing a spherical bearing 50 and a plurality of screw jacks 54. The interface between the stationary table 30 and the main skid frame 22 consists of the 62.0" spherical metal bearing 50 that is free to move up and down within a cylindrical bore 74. Thus, the articulated joint 24 in this embodiment is a ball joint. The spherical bearing 50 encircles (and is welded to) the stinger base tube 76, which is, in turn, bolted to the stationary table 30. This articulated interface reacts all radial loads within the system. Three screw jacks 54 are arrayed at 120° intervals about the articulated joint 24 and tilt the mast 15 up to 15° off vertical on any azimuth. The screw jacks 54 react all vertical loads in the system.

Figure 14:
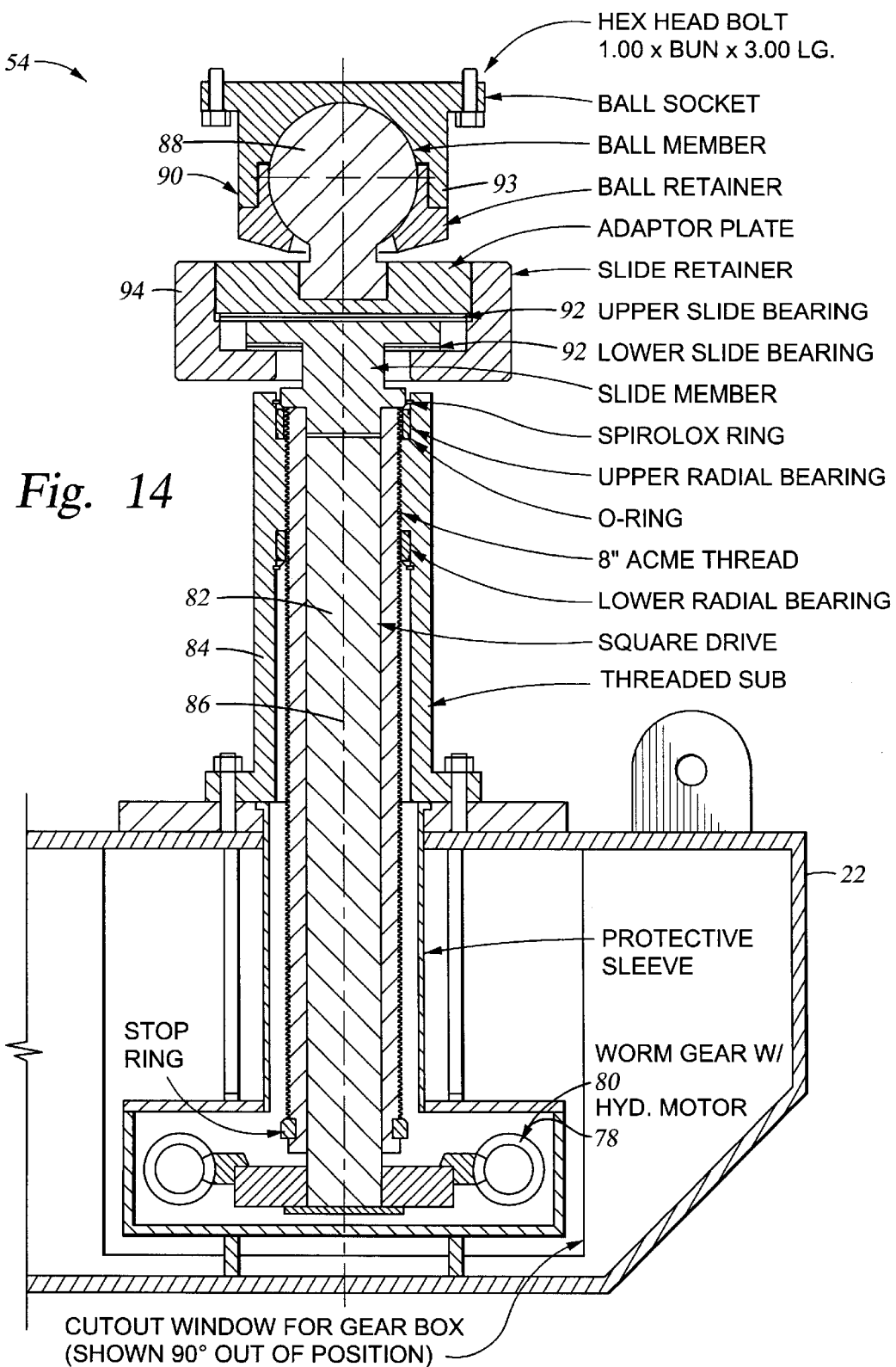
FIG. 14 is a partial cross-sectional, side view of a screw jack as employed in the articulating joint of FIG. 1.

FIG. 14 illustrates a representative one of the screw jacks 54. The screw jack 54 is a mechanical jack driven by a hydraulic motor 78 via a worm gear 80. The nested inner and outer members 82, 84 of the jack 54 have a common threaded interface. Rotation of the inner member 82 in either direction causes the outer member 84 to reciprocate along the common central axis 86. The top of each jack 54 is capped with a secondary articulated joint 90 consisting of a spherical surface 88 and a lateral slide plate 92 arranged back-to-back within a common housing 94. These secondary articulated joints 90 provide compensation for radial adjustments caused by tilting the mast 15, and their position below the articulated joint 24 protects the jacks 54 from side loads.

Thus, changes in deployment angle may be made during pipe laying operations responsive to changing conditions. This is accomplished by actuating the screw jacks 54, which are controlled from the operator's panel on the stationary table 30. The spherical ball joint 90, which is held captive radially by the cylindrical housing 93, is free to pivot and to reciprocate responsive to the changing angular orientation of the stinger base tube 76. Conversely, the base tube 76, as discussed below, is rigidly affixed to the stationary table 30 and, hence, moves in response to angular change in the orientation of the stationary table 30.

Figure 15:
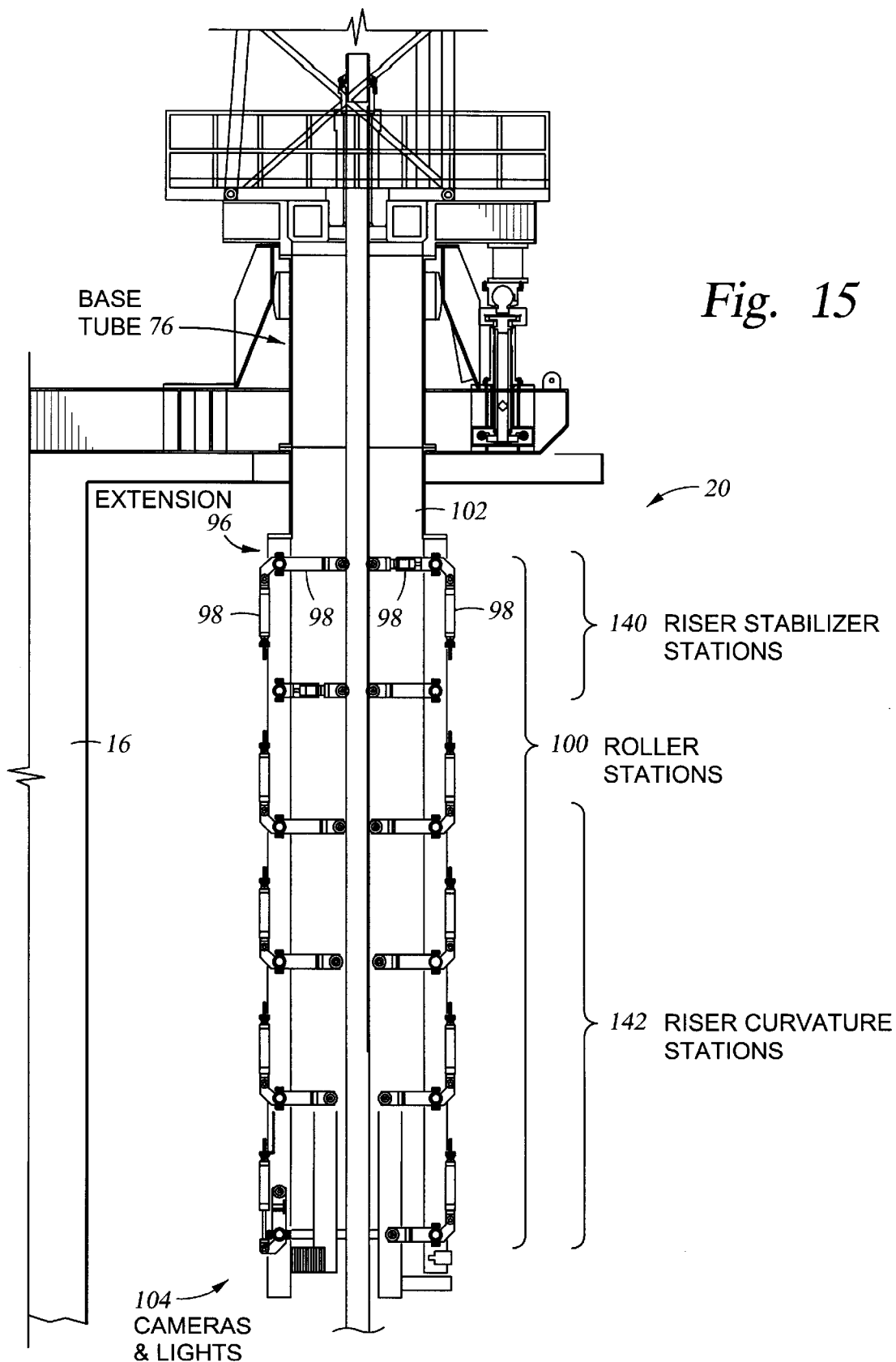
FIG. 15 illustrates the stinger of the embodiment of FIG. 1.

The stinger 20, as illustrated in FIG. 15, is a welded steel structure attached to the bottom of the stationary table 30 on the same central axis as the mast 15. It is flanged and bolted together in two sections; the base tube 76 and the extension 96. The stinger extension 96 houses a series of hydraulically driven rollers 98. In the particular embodiment illustrated, there are rollers 98 at six different locations 100, with four rollers 98 per location. The rollers 98 secure the pipe string 12 and assure that it does not violate the predetermined minimum bend radius during pipe lay operations. The bore 102 of the stinger 20 and the stationary table 30 above are large enough to allow passage of a flexible joint or other package (not shown) for deployment or retrieval. Cameras and lights 104 for monitoring the pipe string 12 are deployed at the bottom of the stinger 20. The hydraulically driven rollers 98 of the stinger 20 are hinged at the outer diameter of the stinger frame, i.e., the stinger extension 96. This feature allows the rollers 98 to be folded up out of the way, thereby allowing the passage of large diameter packages that are sometimes integrated into the pipe string 12 during deployment.

Also, the stinger 20 features two top roller stabilizer stations 140 that stabilize the pipe string 12 as it emerges from the underneath the weld floor, which in the particular embodiment illustrated is the stationary table 30. The rollers 98 of the riser stabilizer stations 140 keep the top pipe joint 17 of the pipe string 12 aligned with the weld position to help prevent the introduction of bending moments at the weld site. The subsequent curvature of the pipe string 12 is controlled by the bottom four riser curvature stations 142, which permit gradually wider excursions from the installation center line as described below.

Although the stinger 20 is disclosed herein in conjunction with the mast 15, this aspect of the present invention is not so limited. The stinger 20 may be used in virtually all subsea pipe laying activities to control critical bending stress in the pipe string 12 both as to the weld floor above and in the deployed pipe string 12 below. The stinger 20 may also be employed for a large range of pipe diameters without the need for reconfiguration or removal.

Figure 16A:
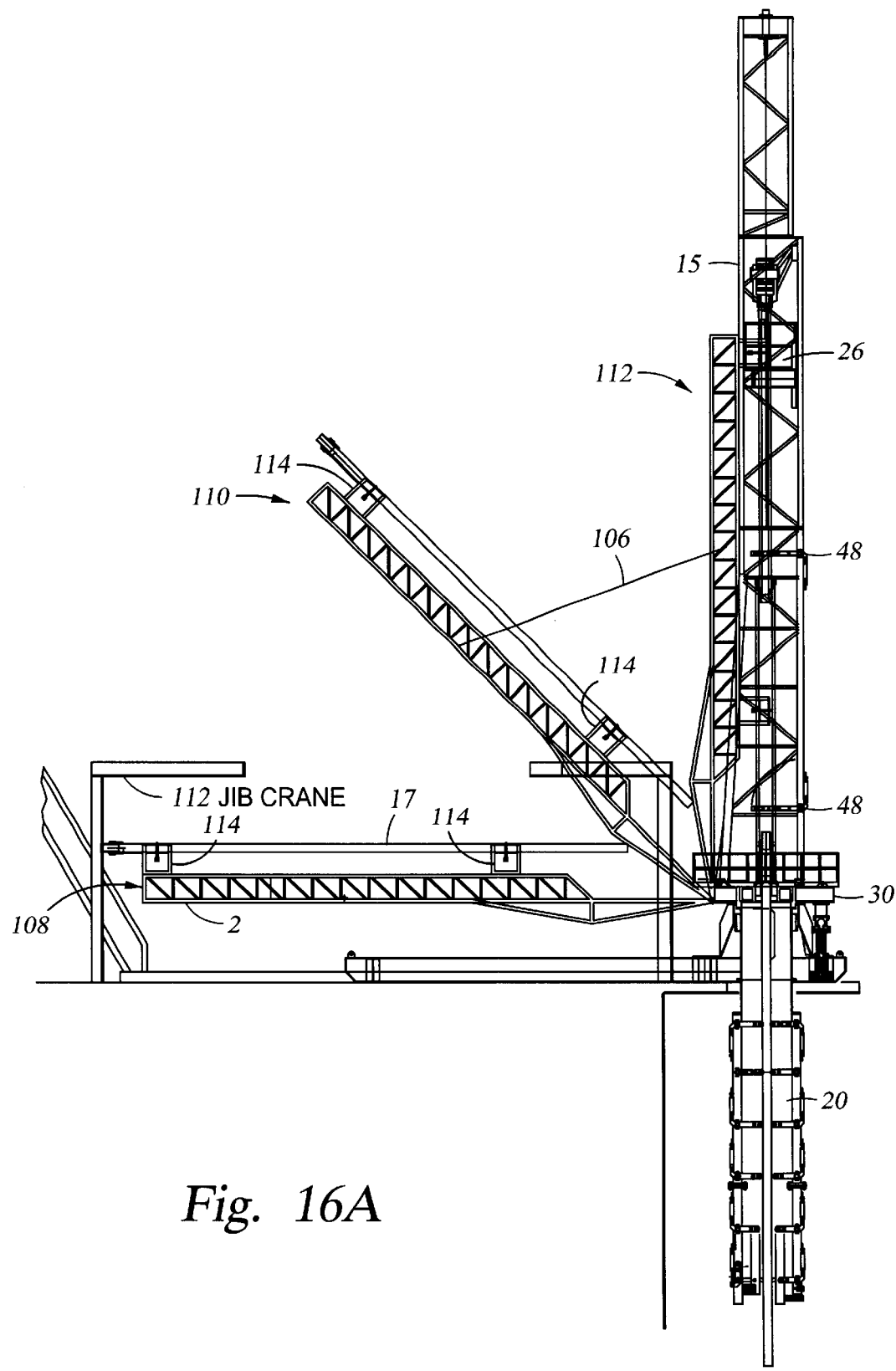
FIGS. 16A–C illustrate the erector system of the embodiment of FIG. 1.

The pipe erector 25, shown best in FIG. 16A, is fastened to the stationary table 30 by a hinge 27 at the base of the mast 15 as shown in FIG. 6 and is actuated by a cable 106 and hydraulic winch (not shown). Returning to FIG. 16A, the pipe erector 25 is shown in a horizontal position 108, an intermediate position 110, and a vertical position 112. It receives the prepped pipe joints 17 one at a time as they are off-loaded from the pipe rack (not shown) by the jib crane 112 while the pipe erector 25 is in the horizontal position 108. Bi-axial rollers (not shown) are incorporated into the erector 25 to allow orientation of the pipe ends and match marks as required. Hydraulically operated clamps 114 secure the pipe joint 17 to the pipe erector 25 as it lifts them through the intermediate position 110 to the vertical position 112 over the pipe string 12 for insertion into the pipe alignment system 46 prior to make-up with the pipe string 12.

Figure 17A:
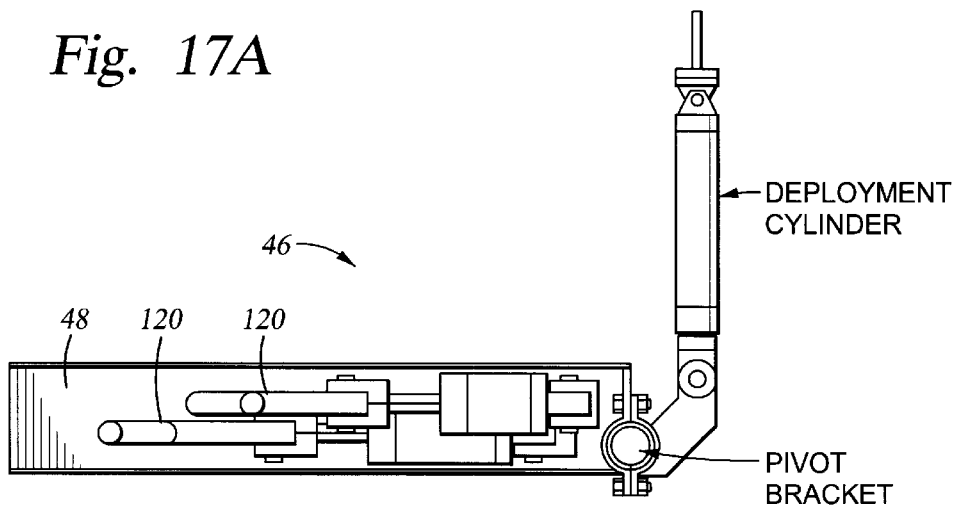
FIGS. 17A–B illustrate the weld alignment and placement system in the embodiment of FIG. 1.
Figure 17B:
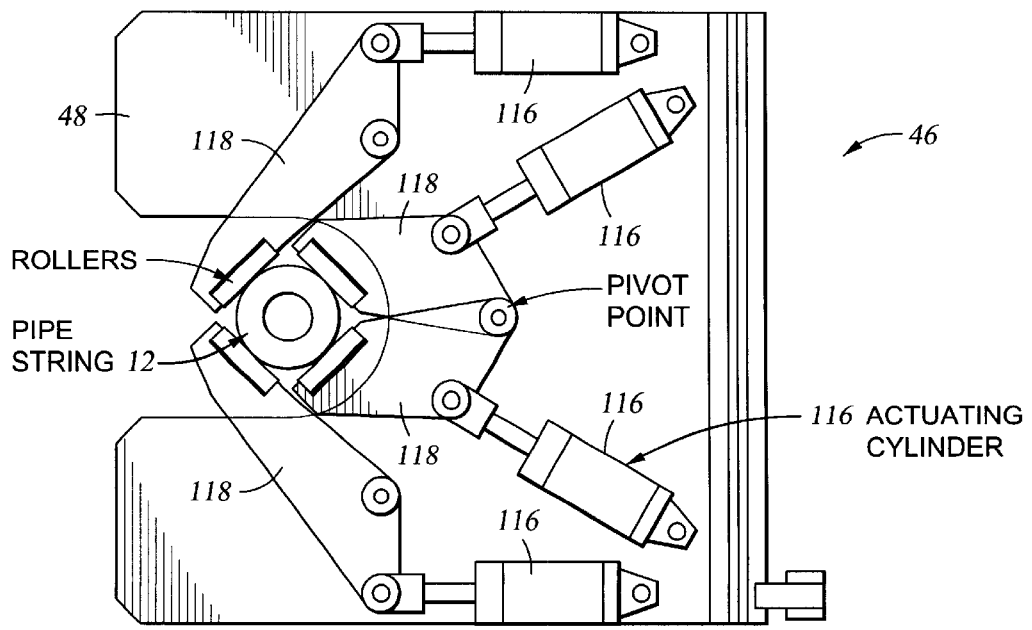

The pipe alignment system 46 includes two centralizing units 48, best shown in FIGS. 17A and 17B, mounted in the mast 15. Each centralizing unit 48 consists of four hydraulic cylinders 116, each driving a pinned cam 118 with a flat face 120. The flat face 120 on each cam 118 interfaces with the pipe joint 17 and applies the force of the corresponding cylinder thereto (multiplied by the eccentric geometry of the pinned cam 118). The centralizing units 48 are mounted in the mast 15 located at two different positions along the length of the pipe joint 17. The hydraulic cylinders 116 are manually activated by an operator (standing at the stationary table 30) in order to visually align the weld preps 40 of the pipe joint 17 for welding. The lower centralizing unit 48 aligns the pipe joint 17 radially and the upper centralizing unit 48, nominally located at the middle of the pipe joint 17, is used to correct angular mismatch of the weld preparations 40.

The pipe erector system is therefore capable of automatically feeding pipe into the mast 15. The erector 25 assures that the pipe joint 17 is aligned with the centerline of the mast 15 regardless of the angle of the mast 15 relative to the deck 34 of the vessel 16. This is principally accomplished by centering the erector 25 on the mast 15 and hinging it at the base thereof. Since the mast 15 and the erector 25 are attached to the same surface, i.e., the stationary table 30, correct angular alignment of the erector 25 is assured.

Thus, in the particular embodiment illustrated, the apparatus 10 comprises the mast 15, the stinger 20 affixed to the stationary table 30 to articulate therewith, and the pipe erector 25 operatively connected to the stationary table 30 and the mast 15. The mast 15 includes the main skid frame 22; a stationary table 30, the stationary table 30 defining with the main skid frame 22 the articulated joint 24; the mast 15 rigidly affixed to and extending upwardly from the stationary table 30; and the traveling table 26, which provides freedom of movement in at least one direction, that being along the central axis of the mast 15. The articulated tower 10 provides freedom of movement in four degrees, including rotation about three primary axes and translation along a centerline of the mast 15.

The tower system 10 may be assembled at the site where the pipe string 12 is to be deployed. The main skid frame 22, mast 15 components, stinger 20 components, and all other parts are shipped as separate pieces. At the installation site on the vessel 16 of choice, they are reassembled and erected for operation. First, all components and support items (power skid, welding pallet, etc.) are laid out on the deck 34 of the vessel 16 in the order of assembly and use. Next, the main skid assembly including the main skid frame 22, stationary table 30, jacks 54, and articulated joint 24 are landed in the position for laying the flowlines. The stinger 20 is keelhauled to a position below the main skid 22 and bolted to the bottom of the stinger base tube 76, which is rigidly attached to the bottom of the stationary table 30 as discussed above. The stationary table 30 is rotated to the full stop position to the rear to allow a stop shoulder (not shown) to be engaged in the articulated section against the frame.

Mast support jigs (also not shown) are then attached to the top of the main skid 22 and the pieces of the mast 15 are assembled to the stationary table 30 on the jigs. Returning to FIG. 1, the lower section 122 of the mast 15 will be in three pieces—two sides, a cylinder, and a center (or back) section. The middle section 124 of the mast 15 will include three similar pieces, without the cylinders. The top section 126 of the mast 15 will be installed as a single piece.

Figure 18:
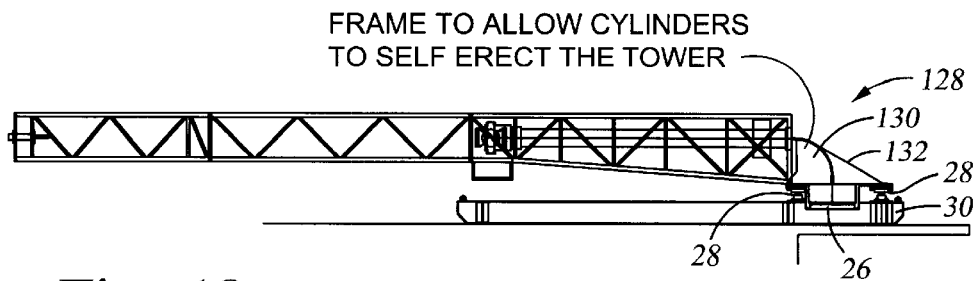
FIGS. 18–20 illustrate a bootstrap mechanism as may be used in some alternative embodiments to erect the articulated tower in FIG. 1.
Figure 19:
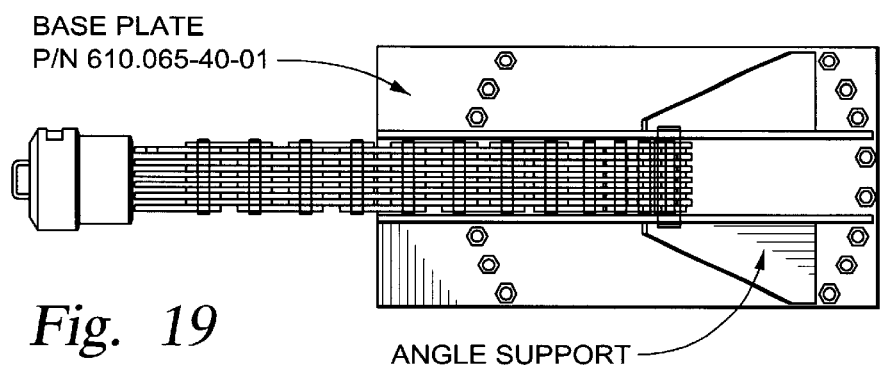
Figure 20:
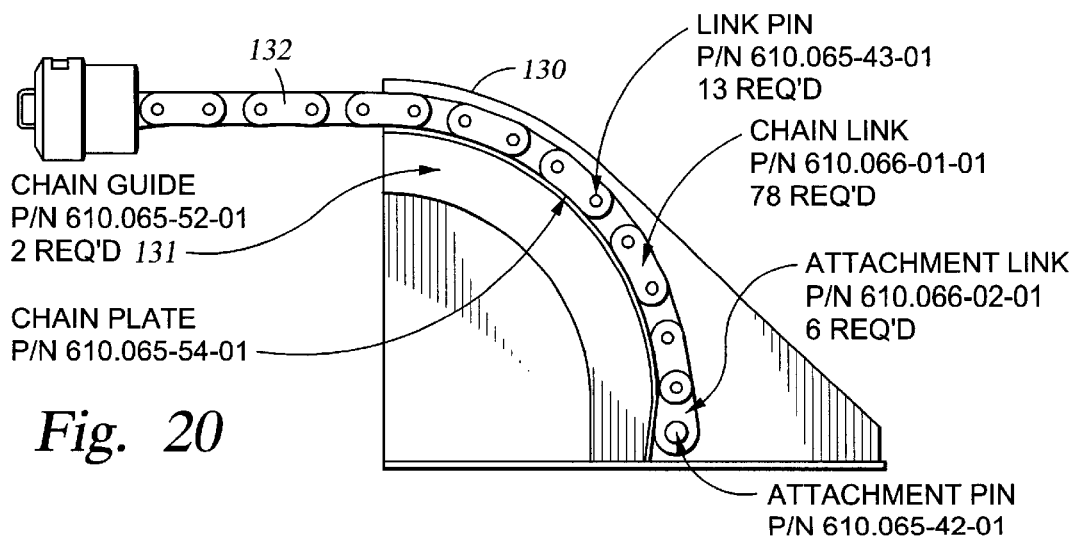

In order to facilitate erection and take-down of the mast 15, a mast erector system, or bootstrap mechanism, 128, best shown in FIGS. 18–20, may be used. The assembly of a tower system, such as the mast 15, is frequently hampered by the lack of a crane tall enough to lift and move the tower on board the vessel. The boot strap mechanism 128 addresses this problem. The boot strap mechanism 128 includes a steel radius frame 130 with multiple chain guides 131 is, in this particular embodiment, temporarily installed on the stationary table 30. A heavy duty link chain 132, shown in FIG. 20, running over the radius frame 130 is attached to the traveling table 26 and, via the radius frame 130, to the stationary table 30.

The mast 15 is then erected using the boot strap mechanism 128. Pressurization of the two main mast cylinders 28 actuates the traveling table 26 which, in turn, tensions the chains 132 and pulls the assembled mast 15 erect (the mast 15 rotates around the hinge line at the front legs). The back legs of the mast 15 and the base of the cylinders 28 are then bolted in place on the stationary table 30. The jacks are then used to bring the mast 15 to the vertical position.

Next, the pipe erector 25 is installed on its hinge line (not shown) on the stationary table 30 in front of the mast 15. The erector 25 is then connected to its actuation cable 106 and winch (not shown) and the hold back winch (also not shown). All peripheral facilities such as the pipe rack (not shown) and skids (not shown) containing the coating equipment and QC/QA equipment are positioned. All electrical, pneumatic and hydraulic hook-ups are completed and tested.

Once assembly is complete, prepped pipe joints 17 are arranged on the pipe rack (not shown) in the order of installation. A temporary double collar 42 is installed around the J-Lay collar 38 on each pipe joint 17 either prior to placement in the pipe erector 25 or while in the erector 25, at the operator's discretion.

Figure 16C:
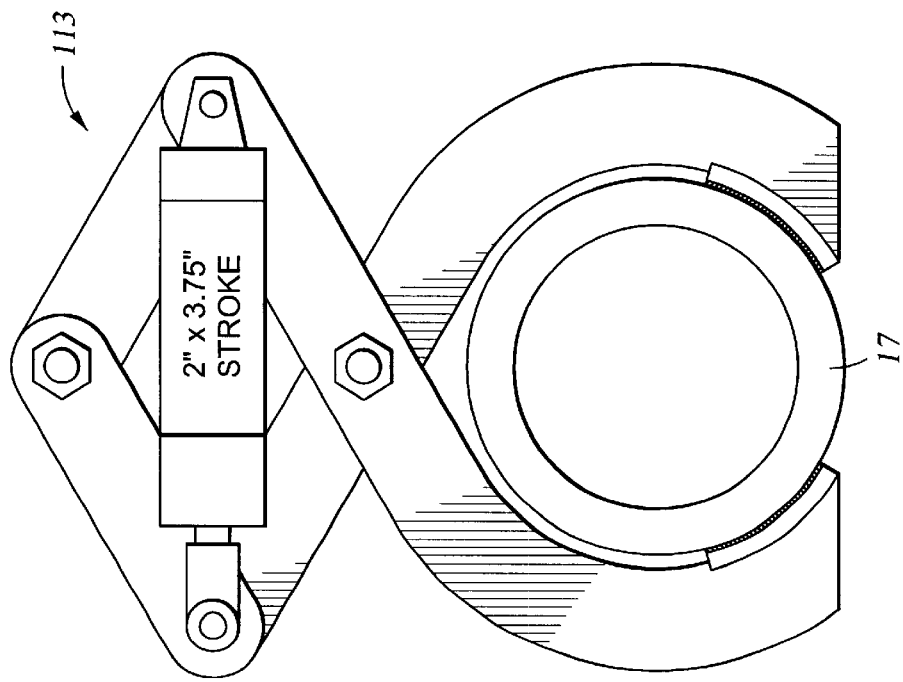
Figure 16B:
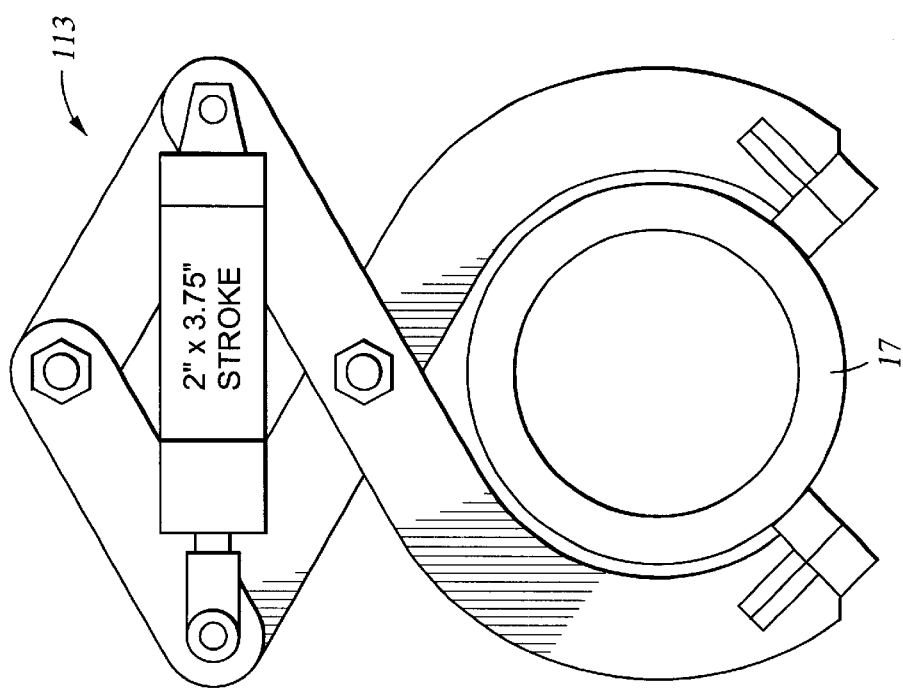

Next, the pipe joint 17 is placed in the cradle with a jib crane 112 using hydraulic tongs 113, shown in FIGS. 16B–C, designed to handle the pipe joints 17. The pipe joints 17 are positioned by the jib crane 112 within the clamps 114 of the erector 25 and between the position markings (not shown) on the erector 25. Once the pipe joint 17 is properly positioned and secured in the erector 25, the erector 25 is activated and rotates upward towards the mast 15 to the vertical position 112, at whatever angle the mast 15 is presently positioned.

As the top of the pipe joint 17 arrives at the vertical position 112, the upper end with the double collar 42 is gripped in the split clamp 44 on the traveling table 26 and the lower length is gripped by two the pipe centralizing units 48. The split clamp 44 grips the upper landing surface 134 of the double collar 42; the lower landing surface 136 being reserved for use when the pipe joint 17 is lowered to the second position at the stationary table 30. The erector clamps 114 are then released and the erector 25 is retracted back down to the horizontal position 108 beside the pipe rack.

The hydraulic cylinders 118 of the centralizing units 48 are then manually activated by an operator standing at the stationary table 30 to align the pipe joint 17 weld preps for welding. The lower centralizing unit 48 aligns the pipe joint 17 radially and the upper centralizing unit 48, at the middle of the pipe joint 17, corrects any angular mismatch of the weld preparations. The pipe joint 17 is then welded onto the pipe string 12 and the weld inspected in accord with techniques well known in the art.

After welding and inspection, the mast cylinders 28 lift the pipe string 12 slightly so that the double collar 42 on the lower pipe joint 17 (at the stationary table 30) can be removed. Once the double collar 42 is removed from the lower pipe joint 17, the traveling table 26 is lowered and the double collar 42 on the top pipe joint 17 is seated at its bottom landing surface 136 in the nested bushings 60, 62 and split bowl 58 installed in the riser hole 52.

Figure 21:
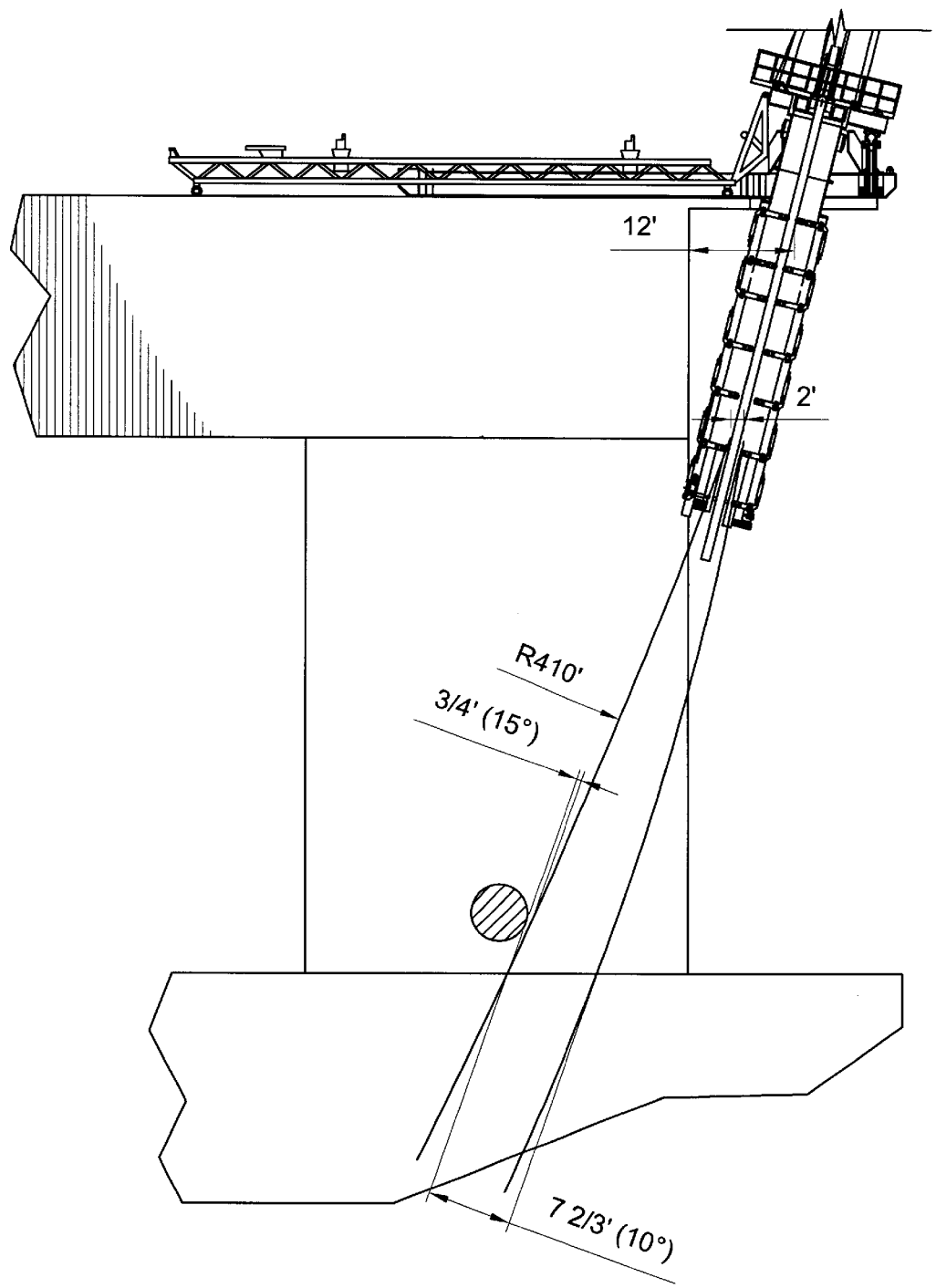
FIG. 21 illustrates how the stinger of FIG. 1 controls the deployment of the pipe string.

As the pipe string 12 descends below the stationary table 30, it passes through base tube 76 and the extension 96 of the stinger 20. The stinger 20, as earlier mentioned, is equipped with six stages 100 of hydraulically actuated rollers 98. The top two sets 140 of rollers 98 keep the pipe string 12 aligned with the centerline of the pipe joint 17 currently being installed. The subsequent curvature of the descending pipe string 12 is controlled by the bottom four sets 142 of rollers 98, which permit gradually wider excursions from the installation center line as shown in FIG. 21.

Figure 22:
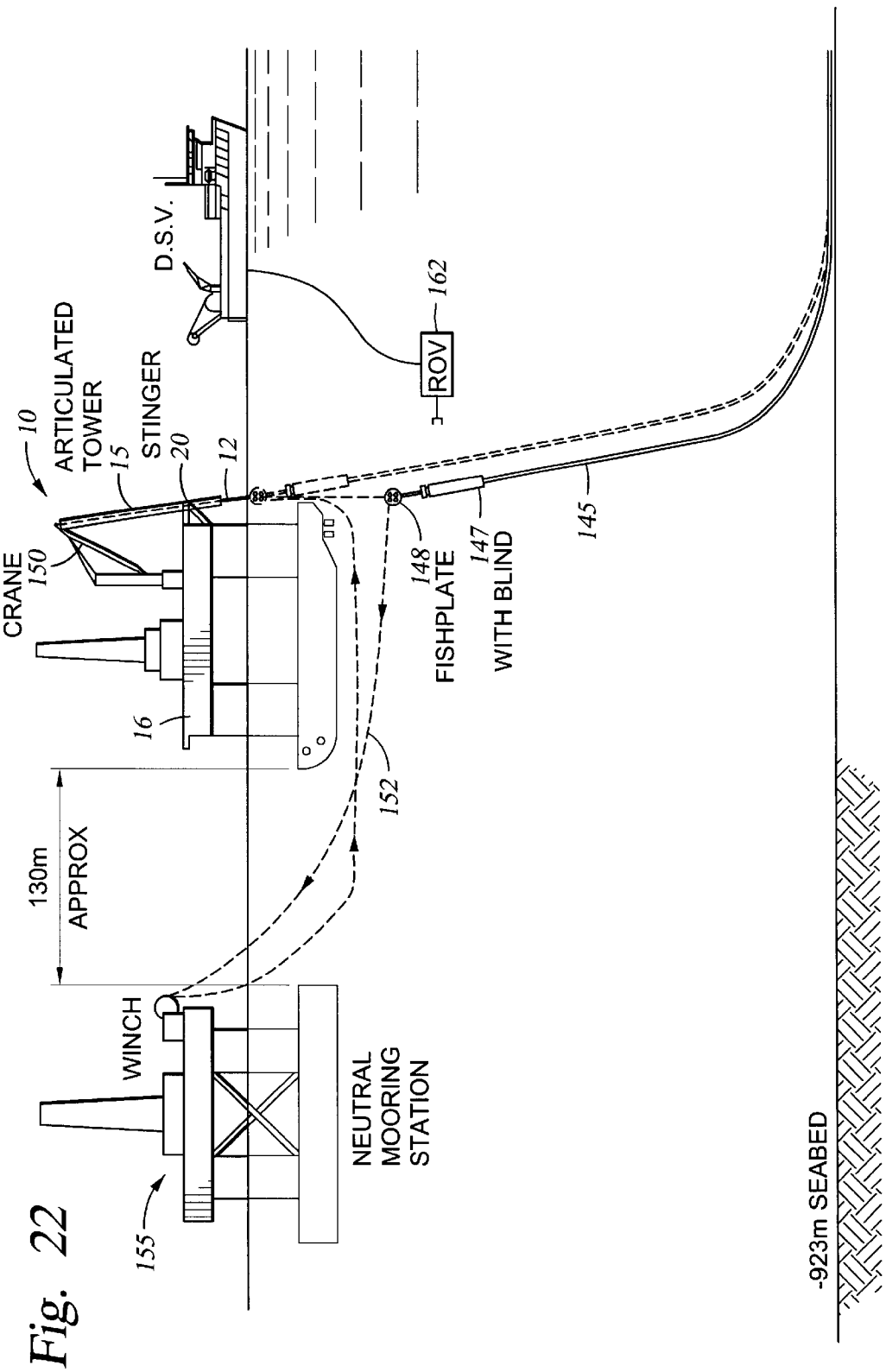
FIGS. 22–25 illustrate how the invention may be employed in several pipe laying operations.
Figure 23:
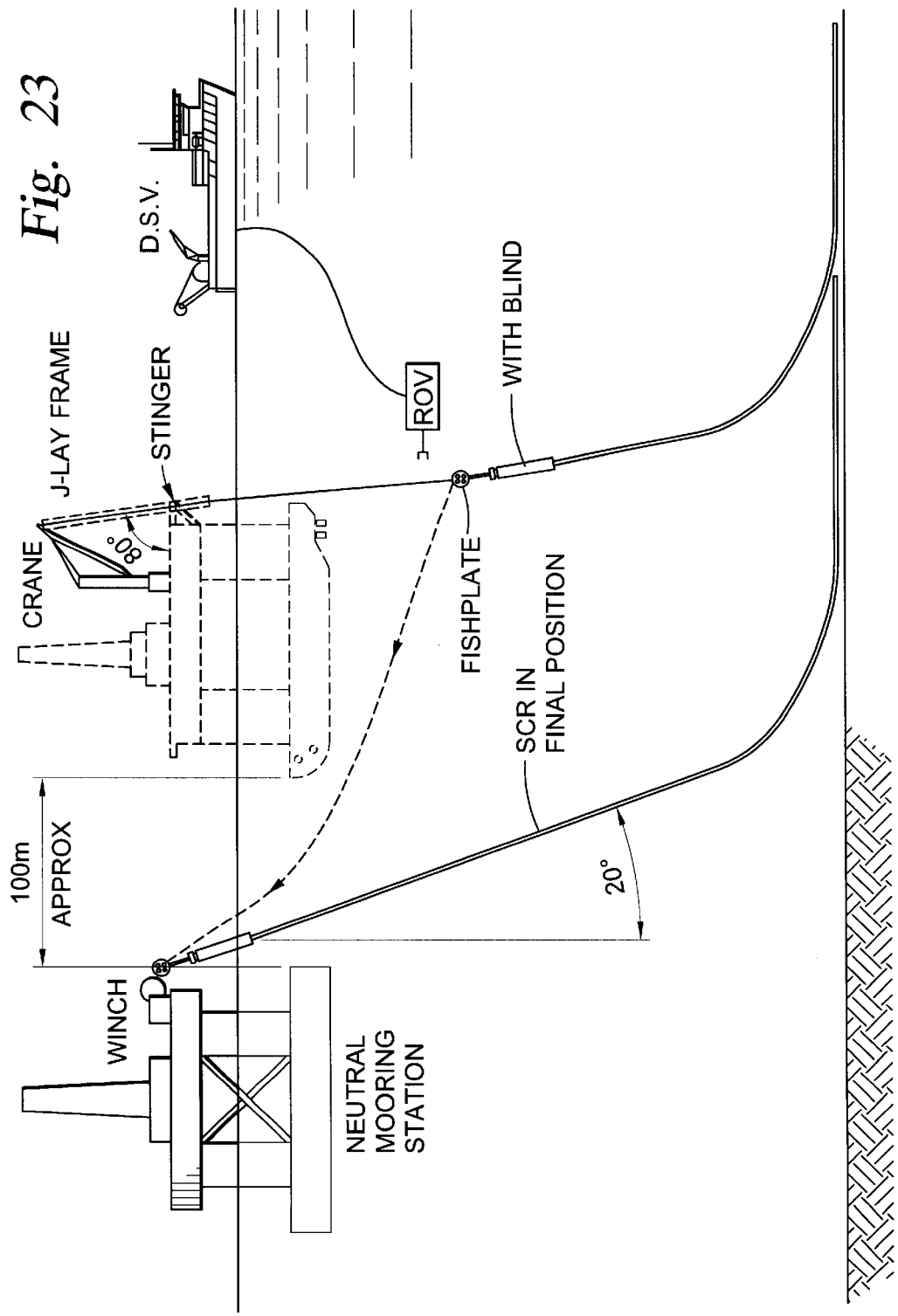
Figure 24:
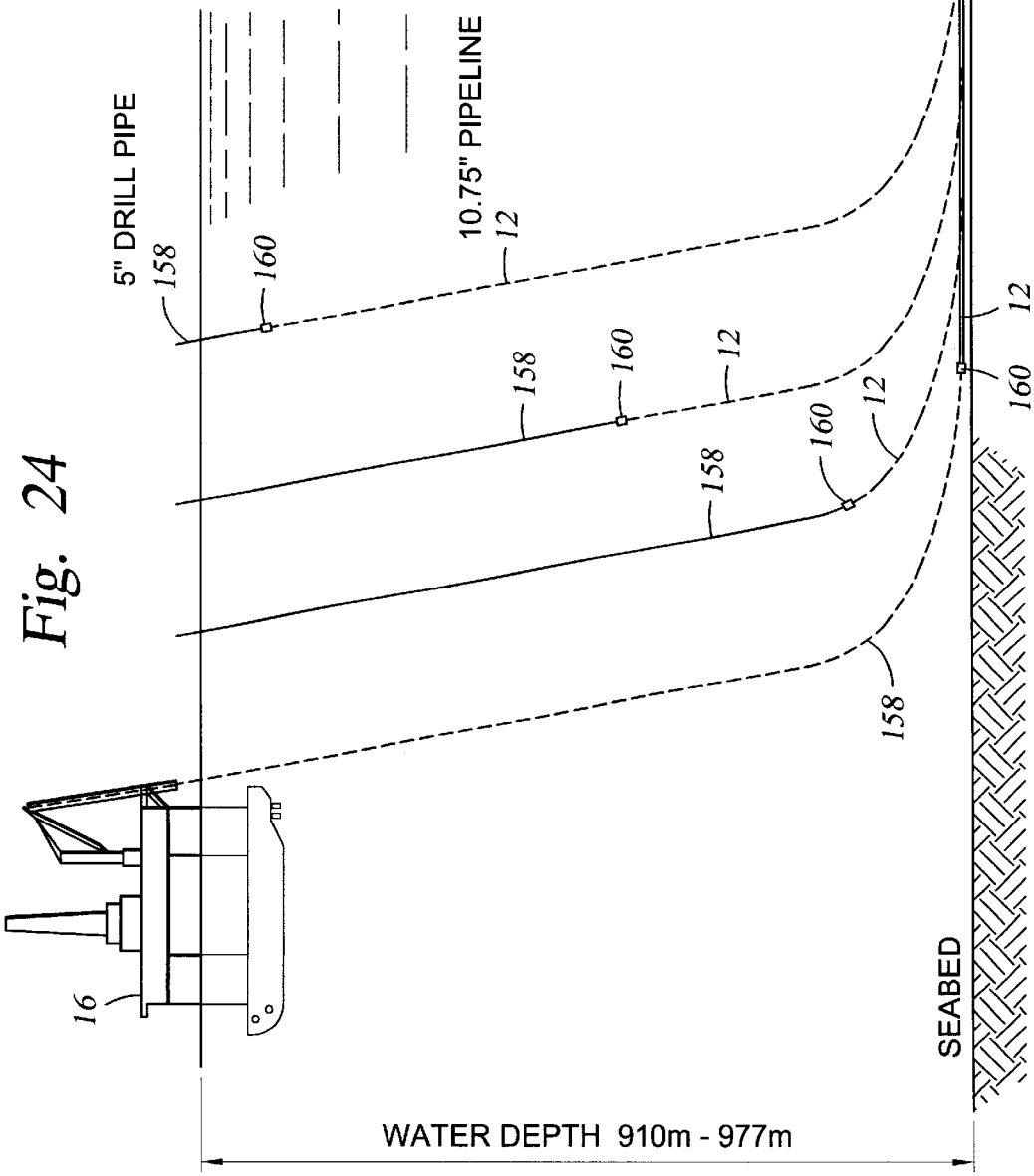

These steps may be repeated to lay a pipeline and establish a riser from the pipe string 12. FIGS. 22–24 illustrate several operations associated with a riser 145. More particularly, FIG. 22 illustrates transfer of the riser 145, FIG. 23 illustrates termination of the riser 145, and FIG. 24 illustrates abandonment of the riser 145.

Figure 25:
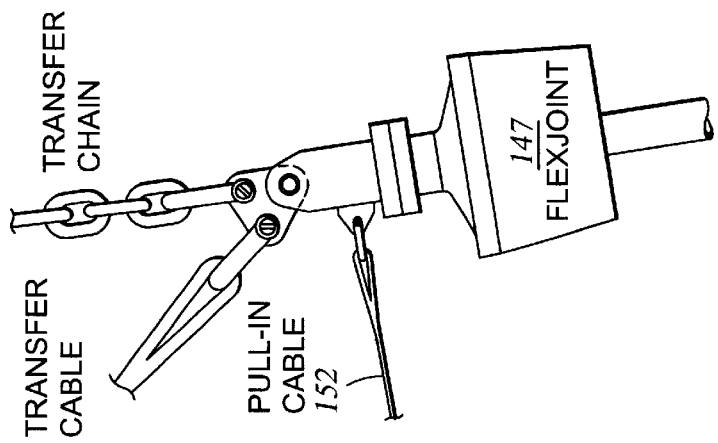

Turning now to FIG. 22, after completing the riser 145 and a flexible joint 147 is integrated into the riser string, a fishplate 148 is attached to the top of the flexible joint 147. An overhead crane 150 on the lay vessel 16 is then connected via cable and shackle (not shown) through the mast 15 to the fishplate 148/flexible joint 147 termination. The weight of the riser 145 is then assumed by the crane 150. FIG. 25 illustrates the set-up of the flexible joint 147 for these operations in greater detail.

Returning to FIG. 22, the crane 150 lowers the end of the riser 145 to a location below the stinger 20 where a line 152 from the receiving vessel 155 can be attached to the fishplate 148. After attachment of the pull-in line 152 from the receiving vessel 155, the riser 145 is lowered to a depth which will allow it to be safely traversed under the lay vessel 16. While the line from the crane 150 is played out, the riser 145 is simultaneously reeled in by the recipient vessel 155 as shown in FIG. 23. After clearing the lay vessel 16, the riser string is pulled upward to a point where the flexible joint 147 is above the receptacle (not shown) on the recipient vessel 155. The flexible joint 147 is then lowered into the receptacle until it is fully seated.

If the need for temporary riser abandonment occurs, then a pipe string 158 (in FIG. 24) of smaller dimensions (composed of standard threaded drill pipe) will be attached to the riser 145 via a special swiveling head 160 welded to the end of the riser 145. The pipe string 158 is deployed through the mast 15 as was the pipe string 12 in the manner described above. The drill pipe string 158 is played out so as to gradually lower the riser 145 to the seabed. Once the riser 145 is laid on the seabed, the pipe string 158 is disconnected and recovered.

The riser 145 may subsequently be recovered, as well. Recovery of the riser 145 requires locating the end of the riser 145 via sonar and a remotely operated vehicle ("ROV") mounted TV 162, shown in FIG. 22 and reattaching the pipe string 158. The pipe string 158 is then retrieved, pulling the end of the riser 145 up from the seabed into the mast 15.

Thus, in the particular embodiment illustrated, the tower system 10 provides the capability to lay both a welded pipeline and a steel catenary riser ("SCR") off the side of a vessel 16. To this end, the tower system 10 incorporates an articulating joint in the mast 15 system 10 itself, interposes a swiveling interface between the pipe string 12 and the mast 15, and permits the mast 15 to articulate in response to varying current, wind, and tidal forces encountered during pipe laying operations. The mast 15 system 10 consequently permits rotation of the stationary table 30 and, hence, the mast 15, stinger 20, and erector 25, about all three primary axes and is capable of (1) aligning itself both angularly and azimuthally with the pipe string 12 as it is deployed in order to attack the pipeline path, wind, and current at the most favorable conditions; (2) maintaining riser tension within a specified envelope: (3) permitting the laying vessel 16 to rotate about the pipe string 12 as weather and operational considerations dictate; and (4) allowing precise control of the riser lay envelope.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for deploying a pipe string, the apparatus comprising:

a mast;

an articulated table to which the mast is affixed:

a stinger affixed to the articulated table to articulate with the mast;

a pipe erector operatively connected to the mast;

a main skid frame defining an articulated joint with the articulated table; and a traveling table providing freedom of movement in at least one direction;

wherein the articulated joint provides freedom of movement in three degrees, including rotation about at least two primary axes for tilting the articulated table azimuthally and angularly to meet a preferred direction and lay angle of the pipe string being deployed, and translation of the articulated table with respect to the main skid frame along a central axis of the mast.

2. An apparatus for deploying a pipe string, the apparatus comprising:

a mast;

an articulated table to which the mast is affixed;

a stinger affixed to the articulated table to articulate with the mast;

a pipe erector operatively connected to the mast;

a main skid frame defining an articulated joint with the articulated table; and a traveling table providing freedom of movement in at least one direction;

wherein the articulated joint includes:

a spherical bearing having an outer diameter and an inner diameter, the spherical bearing being rotatable about at least two primary axes and translatable vertically at the outer diameter within a cylindrical tube rigidly connected to the main skid frame, the inner diameter of the bearing encircling and reciprocating on an outer diameter of a stinger base tube, which is rigidly fixed to a bottom surface of the articulated table; and a plurality of jacks spaced apart about the stinger base tube between the skid frame and the articulated table.

3. The apparatus of claim 2, wherein each of the jacks mechanically converts rotary motion of a gear drive into linear vertical translation of a jack center post to tilt the stationary table to a desired angular orientation.

4. An articulated apparatus for laying a pipeline on a seabed, the apparatus comprising:

a main skid frame;

a stationary table attached to the main skid frame via an articulated joint with at least three degrees of freedom;

a mast erected upon, and rigidly attached to, a top surface of the stationary table;

a traveling table equipped with a pipe clamp device for gripping a riser during alignment, assembly and deployment operations;

a hydraulic means integrated into structure of the mast and interposed between the stationary table and the traveling table for translating the traveling table with respect to the stationary table;

a stinger rigidly attached to a bottom surface of the stationary table; and a pipe erector hinged to the stationary table at a foot of the mast.

5. The apparatus of claim 4, further comprising mechanical means for tilting the stationary table azimuthally and angularly to meet a preferred lay angle of a pipe string being deployed.

6. The apparatus of claim 5, wherein the mechanical means includes:

a spherical bearing having an outer diameter and an inner diameter, the spherical bearing being rotatable about at least two primary axes and translatable vertically at the outer diameter within a cylindrical tube rigidly connected to the main skid frame, the inner diameter of the bearing encircling and reciprocating on an outer diameter of a stinger base tube, which is rigidly fixed to the bottom surface of the stationary table; and a plurality of jacks spaced apart about the stinger base tube between the skid frame and the stationary table.

7. The apparatus of claim 6, wherein each of the jacks mechanically converts rotary motion of a gear drive into linear vertical translation of a jack center post to tilt the stationary table to a desired angular orientation.

8. The apparatus of claim 4, wherein the three degrees of freedom include at least one of rotation about two primary axes and translation along a centerline of the mast.

9. The apparatus of claim 4, wherein the one degree of freedom is along the central axis of the mast.

10. The apparatus of claim 4, wherein the stinger further comprises a base tube and an extension.

11. An articulated apparatus for deploying a subsea pipe string, the apparatus comprising:

a main skid frame;

a table coupled to the main skid frame via an articulated joint;

a mast erected upon the table;

a stinger attached to and depending from the table; and a pipe erector hinged to the table;

wherein the articulated joint includes a spherical bearing rotatable about at least two primary axes and translatable vertically within a cylindrical tube rigidly connected to the main skid frame, the bearing encircling and reciprocating on an outer diameter of a stinger base tube affixed to and depending from the table.

12. The apparatus of claim 11, further including a plurality of jacks disposed about the stinger base tube and coupled between the skid frame and the table for rotating the table azimuthally and angularly to meet a preferred lay angle of the pipe string being deployed.

13. An apparatus for lowering a pipe string made of pipe segments in a near vertical attitude from a floating vessel to a near horizontal attitude on a seabed, comprising:

a skid having a vertical cylindrical member;

an articulated table supported above said skid with a plurality of jacks which are independently actuated to incline said articulated table at angles with two degrees of angular freedom, said articulated table having a spherical member depending therefrom for close engagement with said vertical cylindrical member for reaction of horizontal components of loadings;

a mast supported on said articulated table; and a traveling table with one degree of freedom along the central axis of said mast.

14. The apparatus of claim 13, further comprising an erector being pivoted for raising the pipe segments from a near horizontal attitude on said floating vessel to said central axis of said mast.

15. The apparatus of claim 14, further comprising pivots on said erector being linked to said articulated table.

16. The apparatus of claim 15, wherein when the slope of said articulated table is changed by the adjusting of said jacks, the location of said pivots is changed to cause said erector to pivot said pipe segments to the central axis of said mast.

17. The apparatus of claim 16, further comprising a plurality of rollers adapted to orient the pipe segments in a preferred orientation for connection.

18. The apparatus of claim 13, wherein the loading from the pipe string is divided into vertical and horizontal components.

19. The apparatus of claim 18, wherein the vertical component of said loading from the pipe string is resisted by said jacks.

20. The apparatus of claim 19, wherein the horizontal component of said loading from the pipe string is resisted by said spherical member with said cylindrical member.

21. An apparatus for deploying a pipe string from a near vertical mast on a floating vessel to a near horizontal attitude on a seabed comprising:

a skid;

a stationary table having a pivot hinge location;

a mast having a traveling table, laid down to a near horizontal position, and having a pivot hinge location for engaging said pivot hinge location on said stationary table;

a curved member for attachment to the top surface of said stationary table extending from a near vertical position adjacent to said stationary table to a near horizontal position spaced apart from said stationary table;

a flexible means connected between said traveling table and said near vertical position, such that when a load is pulled on said traveling table by said mast, said mast is erected from said near horizontal position to a more vertical position.

22. The apparatus of claim 21, wherein said flexible means is one or more link chains.

* * * * *